(12) United States Patent
Christöfl et al.

(10) Patent No.: US 7,873,457 B2
(45) Date of Patent: Jan. 18, 2011

(54) CLUTCH CONTROL SYSTEM FOR POWER TRANSFER UNIT IN FOUR-WHEEL DRIVE VEHICLE

(75) Inventors: Thomas Christöfl, Großlobming (AT); Martin Parigger, Eggersdorf (AT); Andreas Teuschel, Tobelbad (AT)

(73) Assignee: MAGNA Steyr Fahrzeugtechnik AG & Co KG, Graz (AT)

( * ) Notice: Subject to any disclaimer, the term of this patent is extended or adjusted under 35 U.S.C. 154(b) by 676 days.

(21) Appl. No.: 11/739,771

(22) Filed: Apr. 25, 2007

(65) Prior Publication Data

US 2007/0255473 A1 Nov. 1, 2007

Related U.S. Application Data

(60) Provisional application No. 60/795,221, filed on Apr. 26, 2006.

(51) Int. Cl.
G06F 17/00 (2006.01)
(52) U.S. Cl. .............................. 701/67; 475/43; 475/51; 475/76; 475/254; 475/293
(58) Field of Classification Search ................ 701/67; 475/43, 51, 76, 254, 293; 307/152
See application file for complete search history.

(56) References Cited

U.S. PATENT DOCUMENTS

| | | | |
|---|---|---|---|
| 4,754,834 A | 7/1988 | Ozaki et al. | |
| 4,874,056 A | 10/1989 | Naito | |
| 5,090,510 A | 2/1992 | Watanabe et al. | |
| 5,151,067 A * | 9/1992 | Huong | 475/43 |
| 5,183,131 A | 2/1993 | Naito | |
| 5,270,930 A * | 12/1993 | Ito et al. | 701/69 |
| 5,407,024 A | 4/1995 | Watson et al. | |
| 5,492,194 A | 2/1996 | MGinn et al. | |
| 5,700,219 A * | 12/1997 | Ohkubo | 475/47 |
| 6,105,702 A | 8/2000 | Showalter | |
| 6,606,549 B1 | 8/2003 | Murakami et al. | |
| 6,655,233 B2 * | 12/2003 | Evans et al. | 74/731.1 |
| 6,663,525 B1 * | 12/2003 | McKee et al. | 475/72 |
| 6,945,909 B2 | 9/2005 | Maekawa | |
| 6,984,172 B2 * | 1/2006 | Talbi et al. | 460/59 |
| 7,032,733 B2 | 4/2006 | Parigger | |
| 7,048,084 B2 | 5/2006 | Shigeta et al. | |
| 7,124,850 B2 | 10/2006 | Lee et al. | |
| 7,207,916 B2 * | 4/2007 | Rodeghiero et al. | 475/78 |
| 7,243,564 B2 * | 7/2007 | Chonan et al. | 74/329 |
| 7,303,498 B2 * | 12/2007 | Ishii et al. | 475/72 |
| 7,361,111 B2 * | 4/2008 | Aitzetmueller et al. | 475/83 |
| 2004/0026154 A1 | 2/2004 | Matsuno | |

(Continued)

FOREIGN PATENT DOCUMENTS

JP 62-163426 7/1987

*Primary Examiner*—Tuan C To
(74) *Attorney, Agent, or Firm*—Harness, Dickey & Pierce, P.L.C.

(57) ABSTRACT

A power transfer assembly for use in a four-wheel drive vehicle has a torque transfer mechanism equipped with a power-operated clutch actuator for controlling adaptive engagement of a friction clutch and a control system for controlling actuation of the clutch actuator. The control system and its method of operation are adapted to control actuation of the clutch actuator based on whether the vehicle is operating in an engine drive mode or an engine coast/braking mode.

18 Claims, 23 Drawing Sheets

Drive Slip Control Module – Torque Increase

U.S. PATENT DOCUMENTS

2004/0078129 A1* 4/2004 Matsuno et al. ............... 701/67
2004/0092363 A1   5/2004 Maekawa
2006/0015238 A1* 1/2006 Motoyama ................... 701/71

* cited by examiner

Drive Slip Control Module – Torque Increase

Drive Slip Control Module – Torque Increase

Drive Slip Control Module – Torque Decrease

Coast Slip Control Module – Torque Increase

Coast Slip Control Module – Torque Increase

Coast Slip Control Module – Torque Decrease

CLUTCH CONTROL SYSTEM FOR POWER TRANSFER UNIT IN FOUR-WHEEL DRIVE VEHICLE

CROSS-REFERENCE TO RELATED APPLICATIONS

This application claims the benefit of U.S. Provisional Application No. 60/795,221, filed on Apr. 26, 2006. The disclosure of the above application is incorporated herein by reference.

FIELD OF THE INVENTION

The present disclosure relates to a system and method for controlling adaptive actuation of a clutch assembly. More specifically, the present disclosure is directed to a power transfer system for a four-wheel drive motor vehicle having a power-operated clutch actuator operable for controlling actuation of a multi-plate friction clutch and a method of controlling actuation of the power-operated clutch actuator.

BACKGROUND OF THE INVENTION

Due to the demand for four-wheel drive and all-wheel drive motor vehicles, a number of power transfer systems are currently incorporated into vehicular drivetrain applications for controlling the transfer of drive torque from the powertrain to the front and rear drivelines. A modern trend in such four-wheel drive vehicles is to provide a power transfer assembly having a transfer clutch that can be adaptively controlled to direct torque to the non-slipping wheels, without any input or action on the part of the vehicle operator, when traction is lost at the other wheels, thereby establishing an automatic or "on-demand" four-wheel drive mode. Typically, the transfer clutch includes a multi-plate friction clutch and a power-operated clutch actuator that is operable for generating and applying a clutch engagement force to the friction clutch. The power-operated clutch actuator usually includes a clutch operator unit and an electrically-powered device (i.e., electric motor, electromagnetic solenoid, etc.) that is actuated in response to control signals supplied by an electronic control system. The output of the electrically-powered device typically controls movement of the clutch operator unit (i.e., ball ramp unit, cam unit, etc.) for varying the magnitude of the clutch engagement force applied by the clutch operator unit to the friction clutch. Adaptive control of the electric control signal is typically based on changes in current operating and/or tractive conditions of the vehicle, as detected by a group of vehicle sensor associated with the control system. The control system for on-demand power transfer systems typically includes a dedicated electronic controller unit (ECU) programmed with adaptive clutch control logic for controlling the transfer of torque across the friction clutch during all types of driving and road conditions for providing enhanced vehicular traction and stability.

The control systems associated with most on-demand power transfer systems utilize the value of the speed differential between the front and rear drivelines as the primary characteristic for adaptively controlling the output signal supplied to the power-operated clutch actuator. However, the clutch control logic associated with such conventional control systems also typically utilizes one or more additional vehicular characteristics such as, for example, vehicle speed, steering angle, yaw rate, transmission gear ratio, brake status, throttle position and engine load when generating the output signal in an attempt to provide optimum traction/stability during most vehicle operating conditions.

While a wide variety of such power transfer systems and related clutch control schemes are currently used in four-wheel drive and all-wheel drive vehicles, a need exists to advance the technology and address recognized clutch control system limitations. Accordingly, the present invention addresses and improves upon conventional clutch control systems.

SUMMARY OF THE INVENTION

It is an object of the present invention to provide a power transfer assembly for use in four-wheel drive motor vehicle having a torque transfer mechanism equipped with a power-operated clutch actuator that is operable to control adaptive engagement of a multi-plate clutch assembly and a control system for controlling actuation of the power-operated clutch actuator.

It is another object of the present invention to provide a control system and method for controlling a clutch assembly located within a transfer case of a four-wheel drive vehicle based on whether the vehicle is operating in an engine drive mode or an engine coast/braking mode.

In accordance with these and other objects of the present invention, the clutch assembly is operably arranged to transfer torque from a first output shaft to a second output shaft of the power transfer assembly. The control system functions to determine an electric control signal that is supplied to an electric controlled device of the power-operated clutch actuator for causing a force generating mechanism to generate a clutch engagement force that is applied to the clutch assembly. The magnitude of the clutch engagement force is established to transfer a desired "command" torque level to the second output shaft. The control system includes two distinct slip control programs or modules each of which functions to determine the command torque value. The first or "drive" slip control program is functional when the powertrain is supplying positive drive torque to the first output shaft. The second or "coast" slip control program is functional when the powertrain is supplying negative coast torque to the first output shaft or the vehicle brakes are applied. The output of both slip control programs is a torque gradient value that is added to the previous command torque value to establish a new command torque value. According to another, not limiting, aspect of the present invention the second output shaft transmits torque from the powertrain to the second driveline. According to a further, not limiting, aspect the clutch assembly is part of a central differential, preferably of a central differential lock.

BRIEF DESCRIPTION OF THE DRAWINGS

Further objects, advantages and features of the present invention will become apparent to those skilled in the art from analysis of the following written description, the appended claims and the accompanying drawings in which:

DETAILED DESCRIPTION OF PREFERRED EMBODIMENT

The present invention is directed to a torque transfer mechanism and a control system for adaptively controlling the transfer of rotary power between first and second rotary members. The torque transfer mechanism finds particular application in power transfer assemblies of the type used in motor vehicle drivetrains such as, for example, on-demand transfer cases, in-line coupling and power take-off units or torque-biasing full-time transfer cases. Such power transfer assemblies are intended for installation in four-wheel drive and all-wheel drive vehicles to control the transmission of torque from the powertrain to the front and rear drivelines. Accordingly, while the present invention is hereinafter described in association with a specific non-limiting drivetrain arrangement, it is to be clearly understood that the teachings of the present invention are likewise intended for use in other suitable vehicular drivetrain applications.

Figure 1:
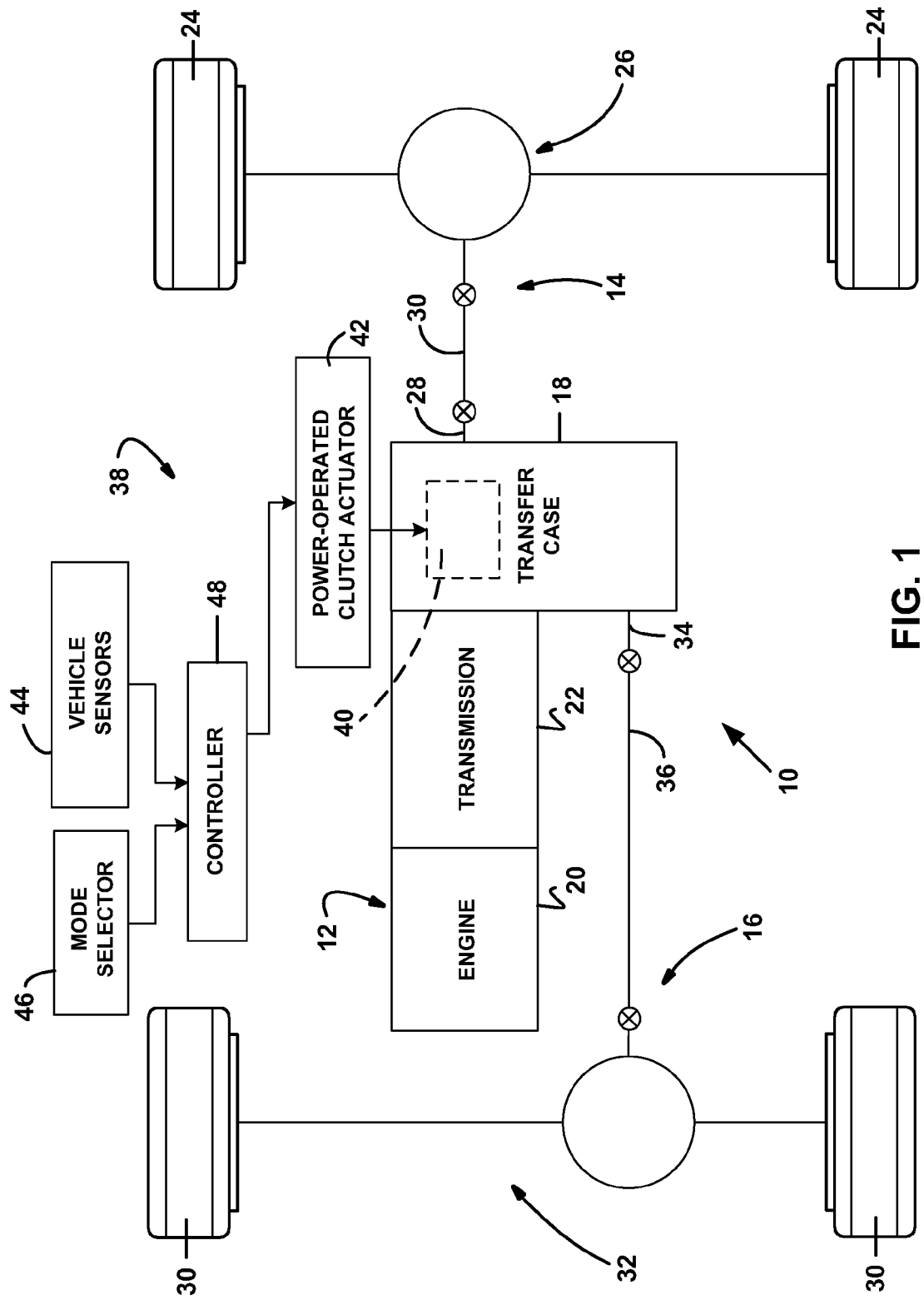
FIG. 1 is a schematic diagram of a four-wheel drive vehicle equipped with a power transfer assembly and a control system according to the present invention.

Referring to FIG. 1 of the drawings, a drivetrain 10 for a four-wheel drive vehicle is shown to include a powertrain 12, a primary driveline 14, a secondary driveline 16 and a power transfer assembly 18. Powertrain 12 functions to generate rotary power (i.e., torque) and is shown to include an engine 20 and a transmission 22. The torque generated by powertrain 10 includes both "drive" torque and "coast" torque based on the output characteristics of engine 20. Torque from powertrain 12 is transmitted to power transfer assembly 18 which, in turn, is operable to transmit torque to primary driveline 14 and secondary driveline 16. Primary driveline 14 is shown as the rear driveline in this particular exemplary arrangement and includes a pair of rear wheels 24 driven by a rear drive axle assembly 26. Torque is transmitted from a rear output shaft 28 of power transfer assembly 18 to rear axle assembly 26 via a rear propshaft 30. Secondary driveline 16 is shown as the front driveline and includes a pair of front wheels 30 driven by a front drive axle assembly 32. Torque is transmitted from a front output shaft 34 of power transfer assembly 18 to front axle assembly 32 via a front propshaft 36. It is to be understood that the subject matter of the present invention disclosed hereinafter is equally applicable to alternative drivetrain arrangements in which the primary driveline is the front driveline and the secondary driveline is the rear driveline.

With continued reference to FIG. 1, drivetrain 10 is shown schematically to further include a torque transfer control system 38 that is operable for permitting a vehicle operator to select operation of the motor vehicle in one of a two-wheel drive mode, a locked or "part-time" four-wheel drive mode and an automatic or "on-demand" four-wheel drive mode. In this regard, power transfer assembly, hereinafter referred to as transfer case 18, is equipped with a transfer clutch 40 that can be selectively actuated for transferring drive torque from rear output shaft 28 to front output shaft 34 for establishing both of the four-wheel drive modes. Control system 38 is shown to include a power-operated clutch actuator 42 for controlling actuation of transfer clutch 40, vehicle sensors 44 for detecting certain dynamic and operational characteristics of the motor vehicle, a mode selector 46 operable to permit selection by the vehicle operator of a desired drive mode and an electronic controller unit (ECU) 48 operable to control actuation of power-operated clutch actuator 42. As will be detailed, ECU 48 uses control programs or schemes based on input signals from sensors 44 and the mode signal from mode selector 46 to generate electric control signals that are delivered to an electric device associated with power-operated clutch actuator 42.

Figure 2:
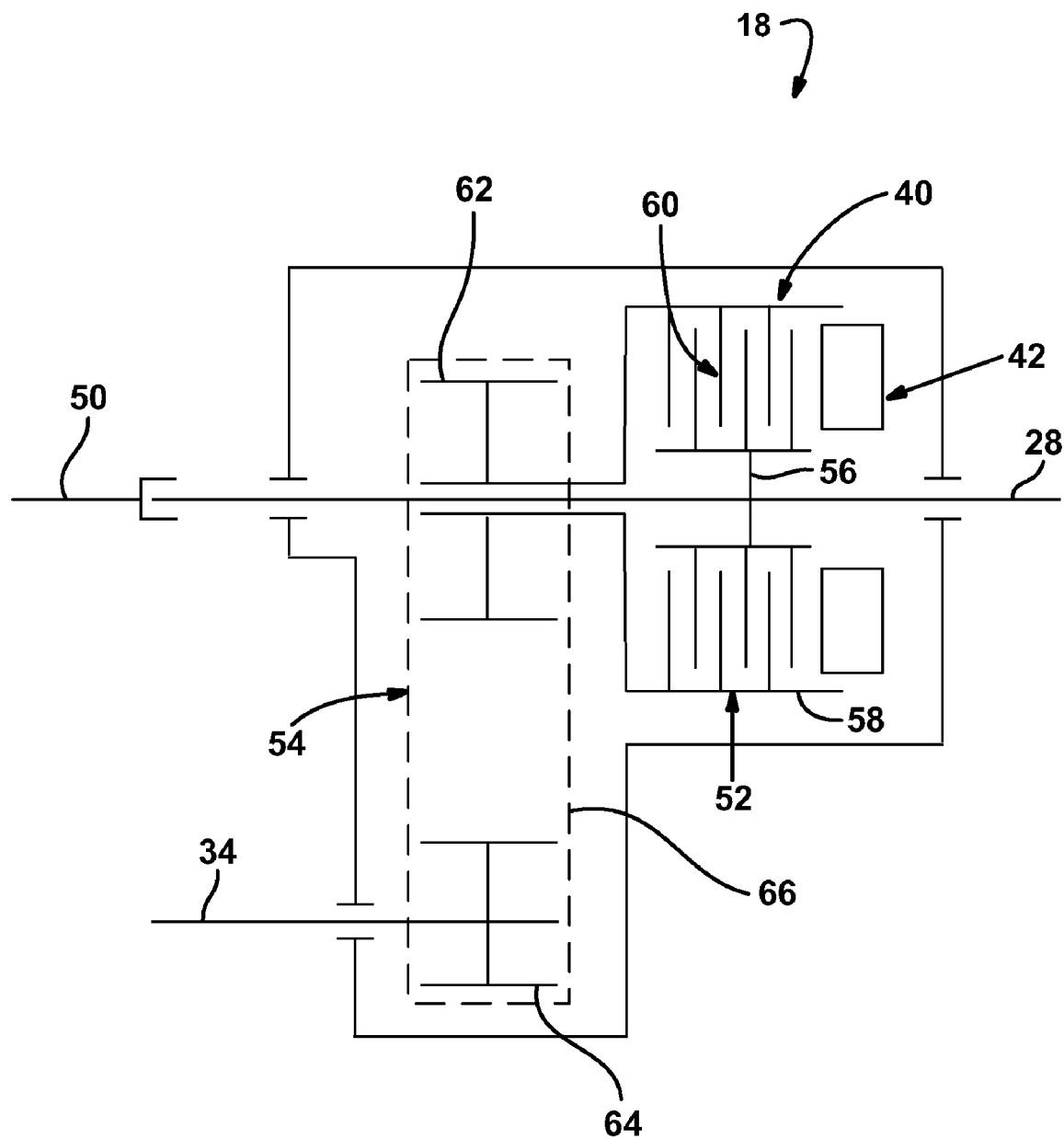
FIG. 2 is a schematic illustration of the power transfer assembly equipped with a torque transfer mechanism having a transfer clutch and a power-operated clutch actuator.

Transfer case 18 is schematically shown in FIG. 2 as having rear output shaft 28 driven by an output shaft 50 of transmission 22 for normally directing all torque from powertrain 12 to rear driveline 14, thereby establishing the two-wheel drive mode. The combination of transfer clutch 40 and power-operated clutch actuator 42 within transfer case 18 defines a torque transfer mechanism. Transfer clutch 40 is operable for transferring torque from rear output shaft 28 to front output shaft 34 and, in accordance with a preferred embodiment, is shown to include a friction clutch assembly 52. Clutch assembly 52 includes a hub 56 fixed for rotation with rear output shaft 28, a drum 58 and a multi-plate clutch pack 60 operably disposed between hub 56 and drum 58. A transfer assembly 54 is provided for coupling clutch drum 58 of clutch assembly 52 for rotation with front output shaft 34. Transfer assembly 54 is shown to include a first sprocket 62 fixed for rotation with drum 58, a second sprocket 64 fixed for rotation with front output shaft 34 and a power chain 66 encircling sprockets 62 and 64. In operation, actuation of power-operated clutch actuator 42 controls the magnitude of a clutch engagement force applied to clutch pack 60, thereby controlling the amount of torque transferred from rear output shaft 28 through friction clutch assembly 52 and transfer assembly 54 to front output shaft 34.

Figure 3:
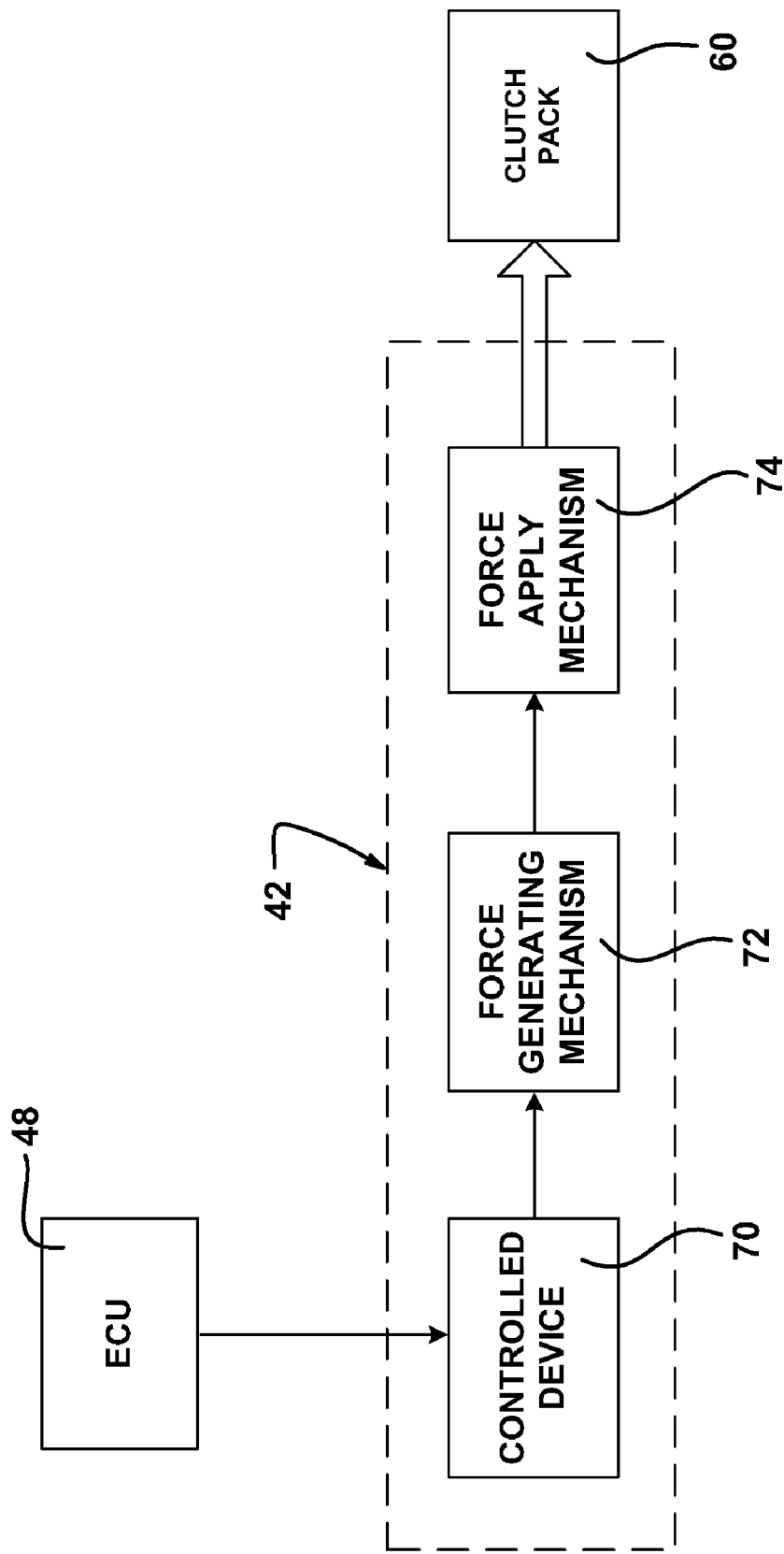
FIG. 3 is a diagrammatic illustration of the power-operated clutch actuator associated with the present invention.

Power-operated clutch actuator 42 is schematically shown in block format in FIG. 2 to cumulatively represent the components required to accept control signals from ECU 48 and generate and apply the clutch engagement force on clutch pack 60. To this end, FIG. 3 diagrammatically illustrates the basic components associated with a preferred arrangement for power-operated clutch actuator 42. Specifically, clutch actuator 42 includes an electric driver or controlled device 70, a force generating mechanism 72 and a force apply mechanism 74. In electromechanical systems, controlled device 70 represents such components as, for example, an electric motor or an electromagnetic solenoid assembly capable of receiving electric control signals from ECU 48. The output of controlled device 70 functions to drive (i.e. rotate or translate) an input component of force generating mechanism 72 in response to the electric control signals. Force generating mechanism may include, for example, a ballramp unit, a ballscrew unit, a cam-driven pivot lever or the like, each of which is capable of converting the driven output of controlled device 70 into a desired clutch engagement force. In particular, an output component of force generating mechanism 72 functions to control movement of force apply mechanism 74 relative to clutch pack 60. As such, force apply mechanism 74 functions to transmit and exert the clutch engagement force generated by force generating mechanism 72 onto clutch pack 60. In most anticipated applications, force apply mechanism 74 includes a piston or an apply plate that is axially moveable relative to clutch pack 60.

Controlled device 70 is capable of receiving the electric control signals from ECU 48 and generating a corresponding or proportional output that is transmitted to force generating mechanism 72 for permitting variable regulation of the magnitude of the clutch engagement force applied to clutch pack 60. Such variable control of the clutch engagement force results in corresponding variable control of the amount of drive torque transferred across clutch assembly 52 to front output shaft 34. As noted, the output of controlled device 70 causes movement of force generating mechanism 72 which, in turn, causes movement of force apply mechanism 74 relative to clutch pack 60. Typically, the output of controlled device 70 controls movement of force apply mechanism 74 between a first position whereat a minimum clutch engagement force is applied to clutch pack 60 and a second position whereat a maximum clutch engagement force is applied to clutch pack 60. Accordingly, accurate position control of the output of controlled device 70 or the position of force apply mechanism 74 is critical to accurately control the clutch torque that is transferred across friction clutch 52.

Pursuant to the exemplary arrangement shown, the vehicle operator is capable of selecting between at least three distinct operational drive modes via manipulation of mode select mechanism 46. As mentioned, these operational drive modes include the two-wheel drive mode, the part-time four-wheel drive mode and the on-demand four-wheel drive mode. The two-wheel drive mode is established when control system 38 signals electric controlled device 70 of power-operated clutch actuator 42 to move force apply mechanism 74 to its first position. As such, the minimum clutch engagement force is applied to clutch pack 60 such that friction clutch assembly 52 is considered to be fully released with all torque from powertrain 12 delivered via rear output shaft 28 to rear driveline 14. In contrast, control system 38 signals controlled device 70 of power-operated clutch actuator 42 to move force apply mechanism 74 to its second position when the part-time four-wheel drive mode is selected. As such, the maximum clutch engagement force is applied to clutch pack 60 such that friction clutch assembly 52 is considered to be fully engaged. When the part-time four-wheel drive mode is established, friction clutch assembly 52 couples front output shaft 34 for common rotation with rear output shaft 28.

Selection of the on-demand four-wheel drive mode results in control system 38 varying the value of the control signals sent to controlled device 70 for regulating the movement of force apply mechanism 74 between its first and second positions. More preferably, however, control system 38 varies the control signal values sent to controlled device 70 for regulating movement of force apply mechanism 74 between an intermediate or adapt-ready position and its second position. Specifically, location of force apply mechanism 74 in its adapt-ready position causes a predetermined preload clutch engagement force to be applied to clutch pack 60 for taking up clearances in friction clutch assembly 52 and transferring a predefined amount of drive torque (i.e., "pre-torque") to front output shaft 34. The pre-torque value can be a constant value. As an alternative, the pre-torque value can be varied to meet desired vehicular traction and stability requirements based on several factors including, for example, engine torque, vehicle speed and lateral acceleration.

When operating in the on-demand four-wheel drive mode, ECU 48 receives input signals from sensors 44 to determine the current tractive conditions and vehicle operating characteristics and generates a new control signal every computational cycle. According to one preferred control strategy, the computational cycle time is in the range of 5-20 milliseconds with a 10 millisecond cycle time most preferred. The new value of the control signal is generated based on predefined slip control programs stored within ECU 48 for determining a desired or "target" clutch torque value. Thereafter, the new control signal is sent to controlled device 70 for causing force generating mechanism 72 to move force apply mechanism 74 to an actuated position between its adapt-ready and second positions that generates the desired clutch engagement force for transmitting the target clutch torque across clutch assembly 52 to front output shaft 34.

Figure 4:
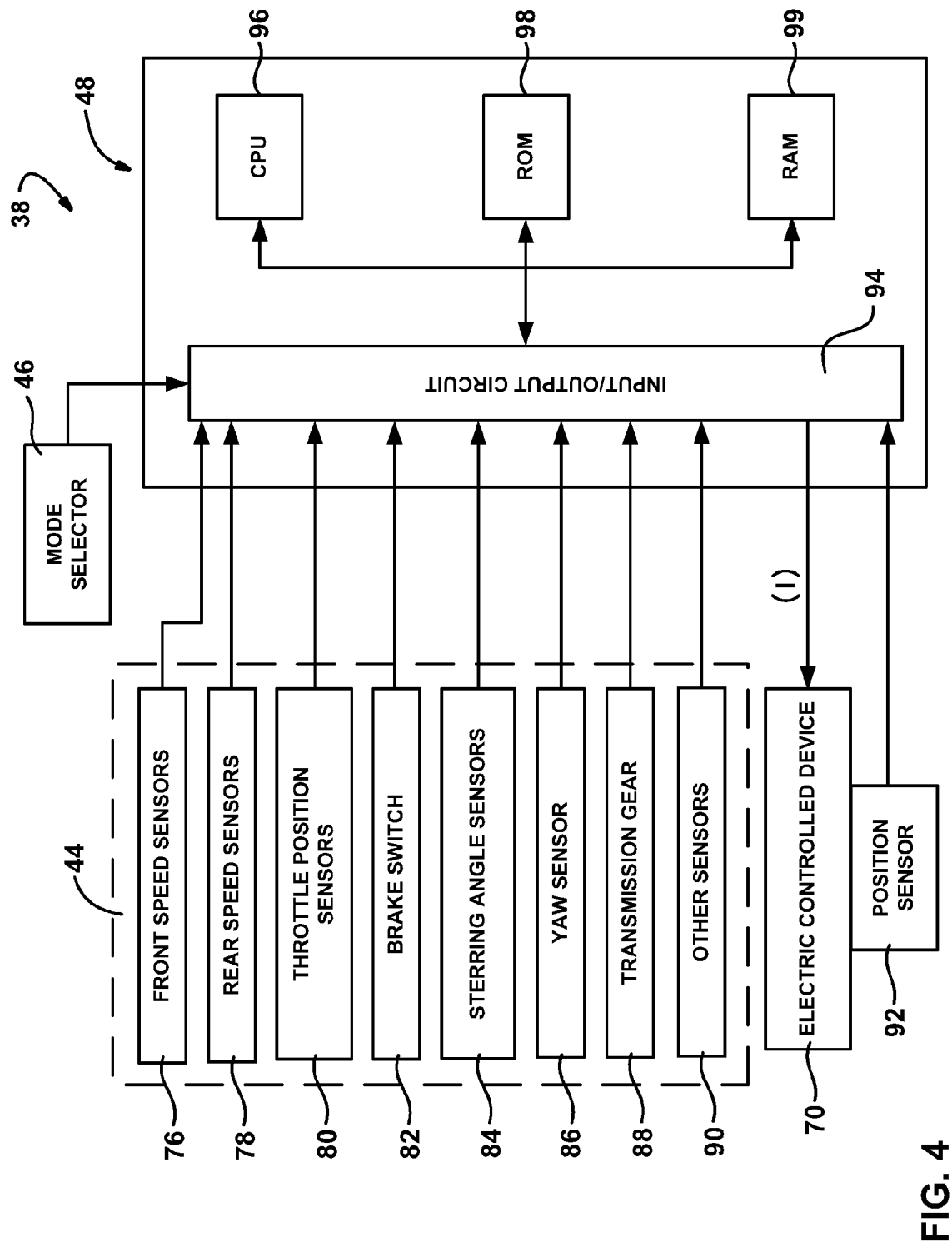
FIG. 4 is a block diagram of an exemplary control system suitable for use with the power-operated clutch actuator.

Referring now to FIG. 4, an exemplary configuration for ECU 48 and the input signals from sensors 44 is disclosed. As seen, sensors 44 may include an array of vehicle sensors such as front wheel speed sensors 76 and rear wheel speed sensors 78 capable of detecting the individual wheel speeds or shaft speeds and determining the vehicle speed, a throttle position sensor 80 capable of detecting the throttle position, a brake switch 82 indicating whether the vehicle brakes are applied and a steering angle sensor 84 for detecting the angular position of the steering wheel. The array of sensors 44 is shown to also include a yaw sensor 86 for detecting yaw movement of the vehicle body and a transmission gear sensor 88 indicating the current gear ratio of transmission 22. Sensors 44 also includes a block 90 that is indicative of one or more other sensors that may be considered for possible use with control system 38. Finally, a position sensor 92 detects the position of the moveable output component of electric controlled device 70. As seen, input signals from sensors 44 are delivered to an input/output circuit 94 of ECU 48 which also functions to output the command electric signal to electric controlled device 70 of power-operated clutch actuator 42. ECU 48 may also include a CPU 96 for executing various operational processes, a ROM 98 which stores the torque control programs to be executed by CPU 96 and a RAM 99.

Figure 5A:
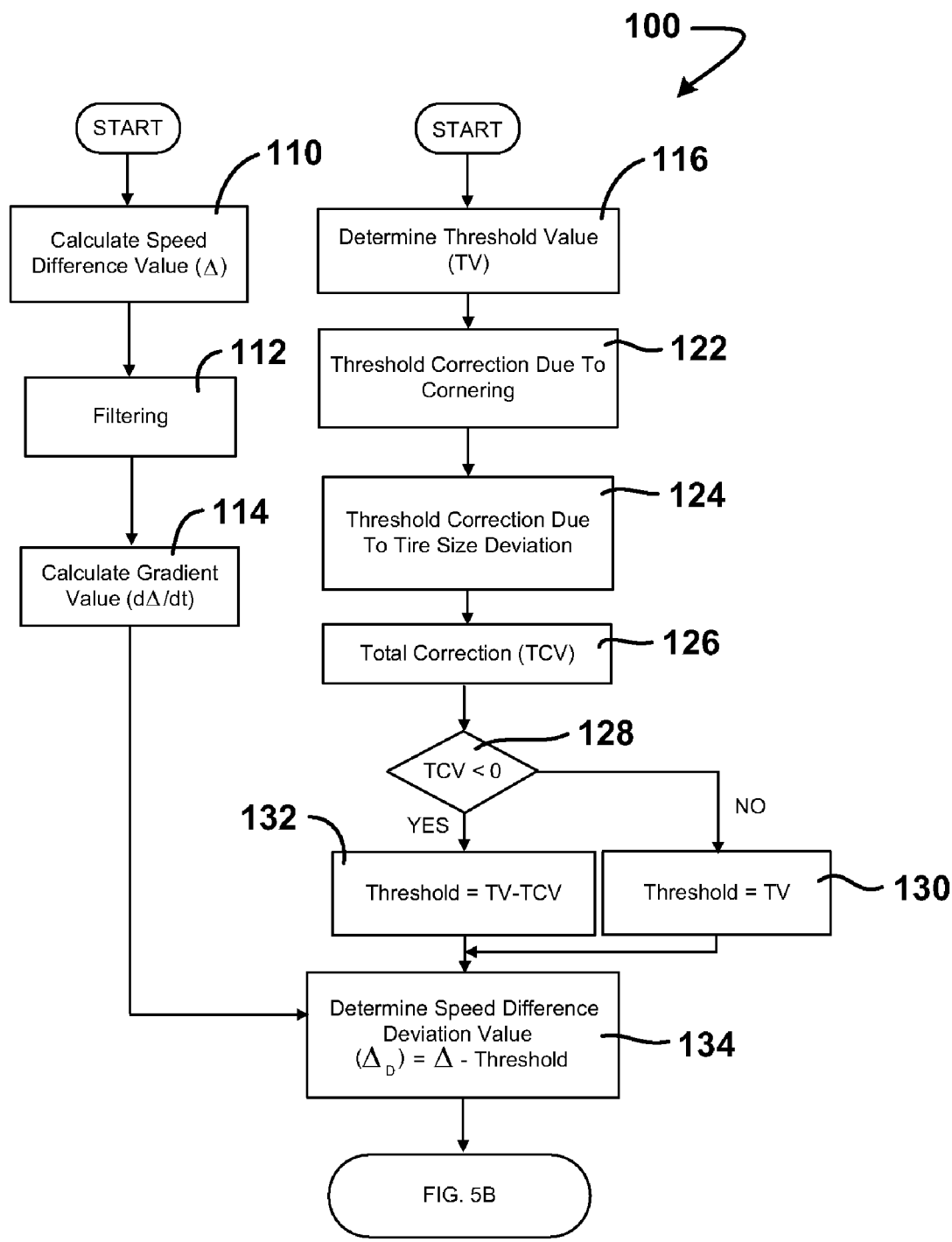
FIGS. 5A through 5C are flow charts illustrating a "drive" slip control program executed by the control system.
Figure 5B:
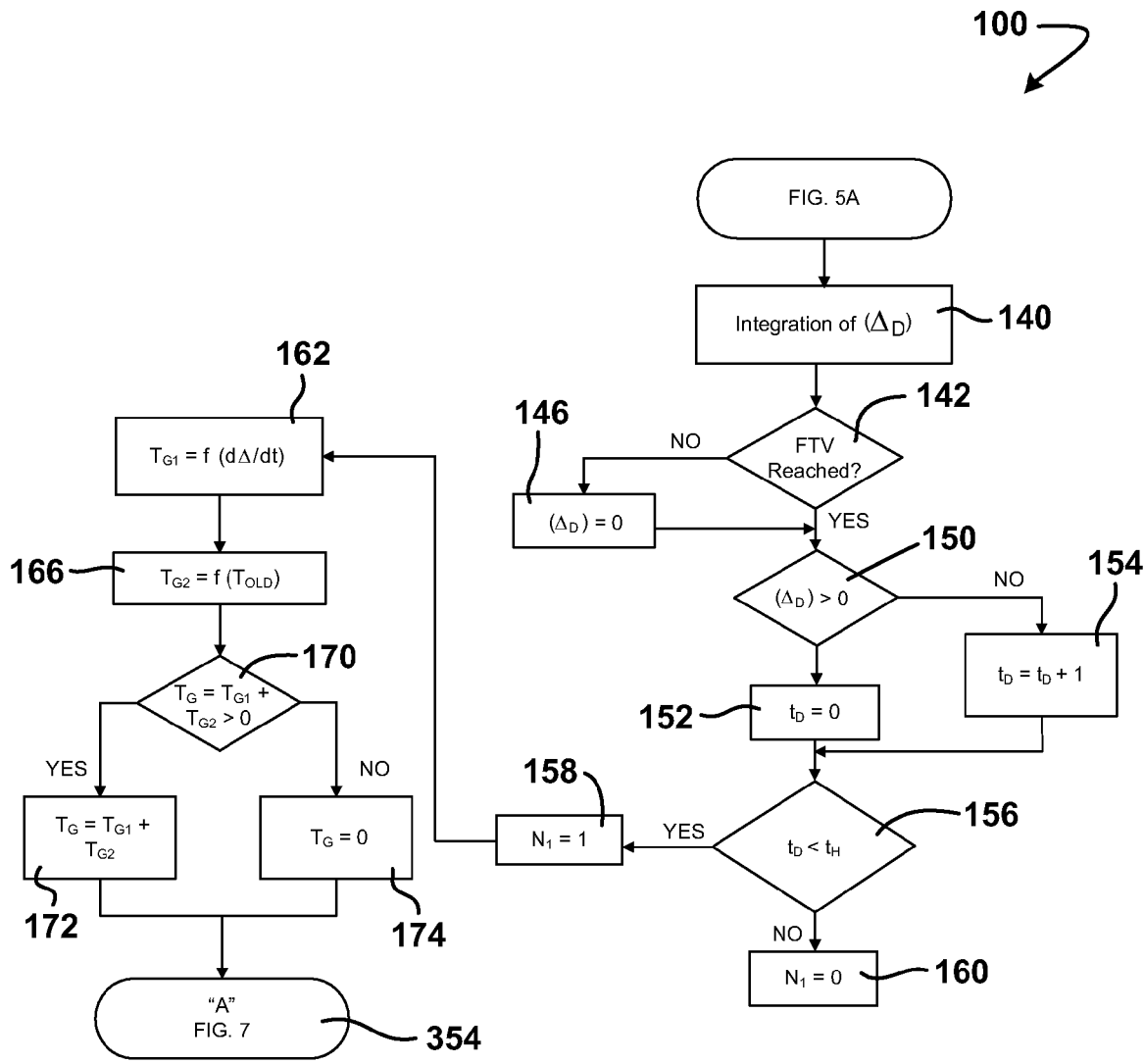
Figure 5C:
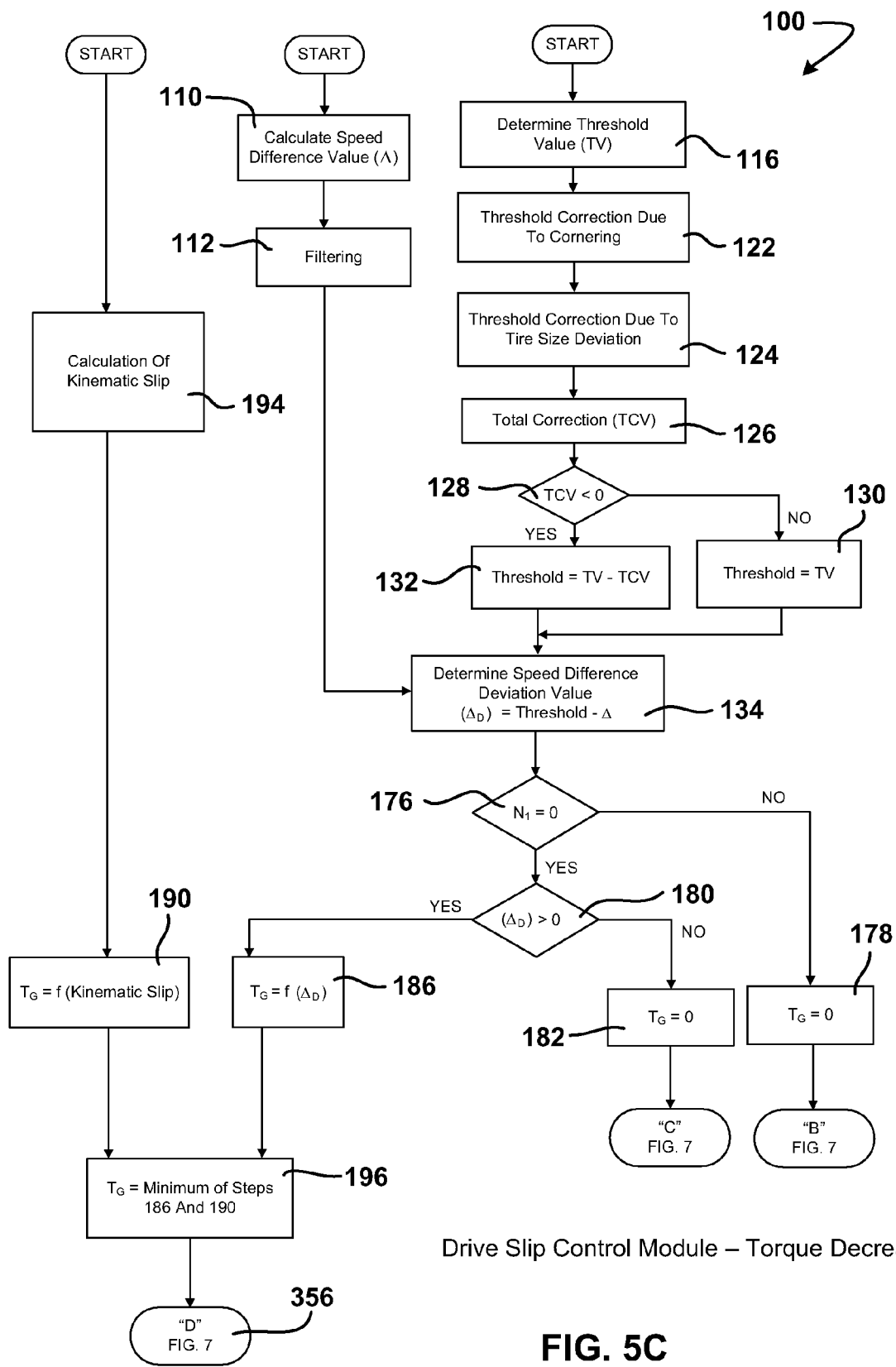
Figure 6A:
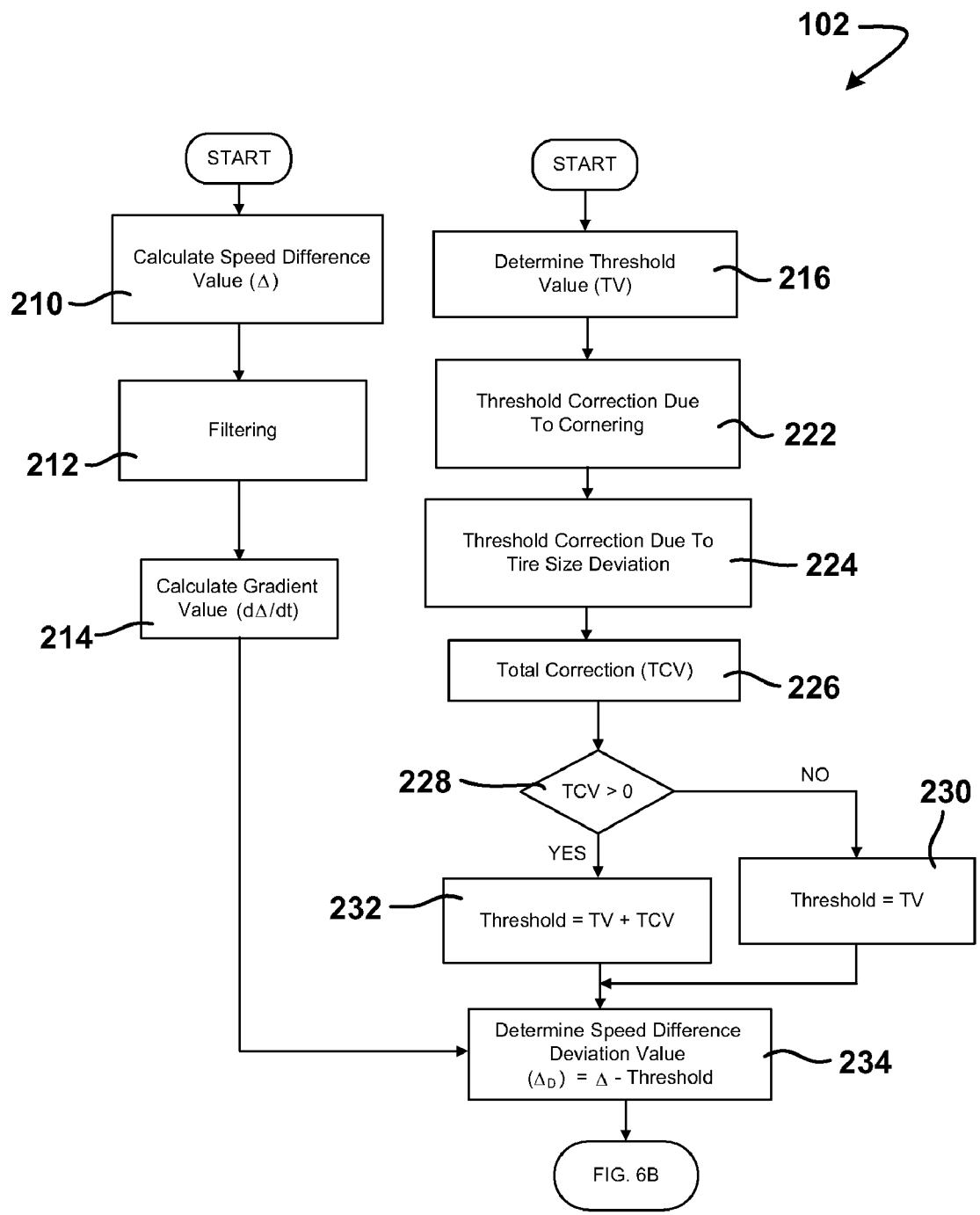
FIGS. 6A through 6C are flow charts illustrating a "coast" slip control program executed by the control system.
Figure 6B:
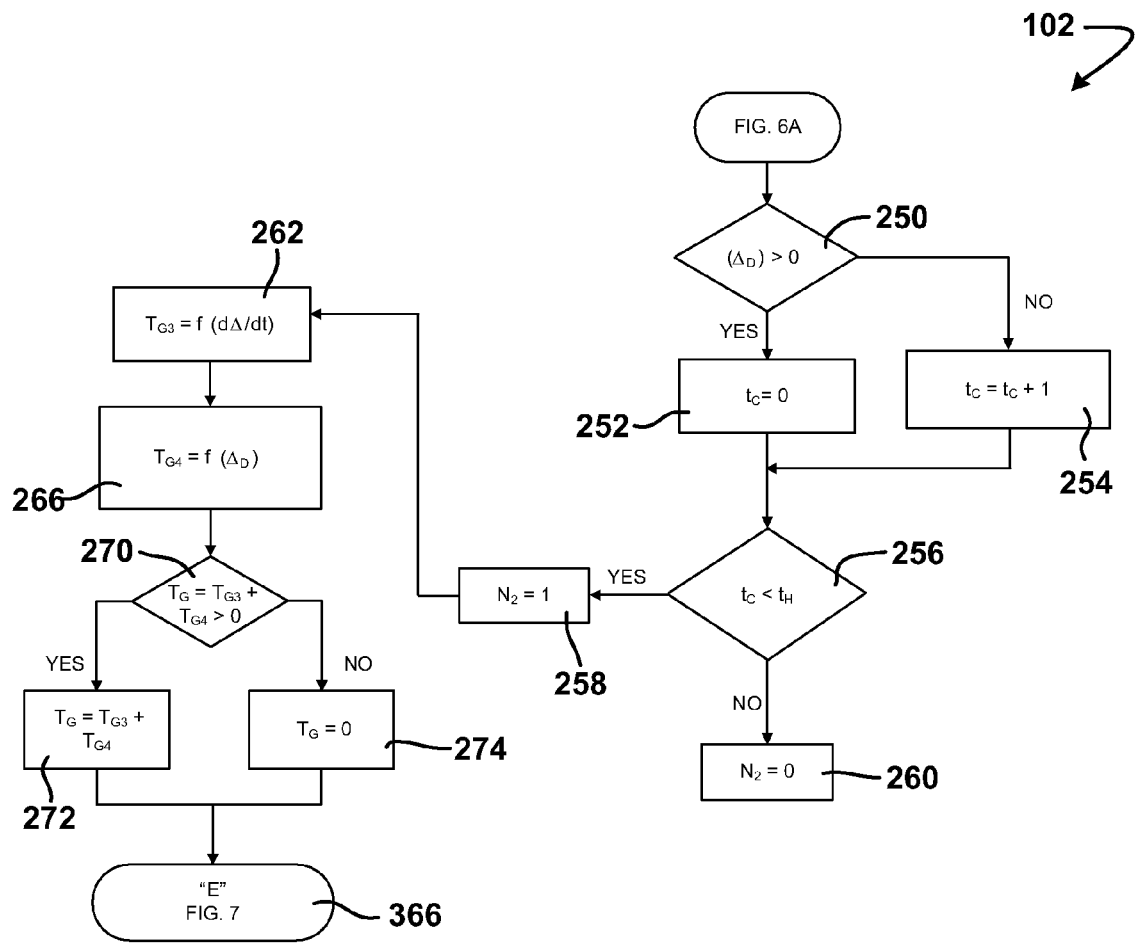
Figure 6C:
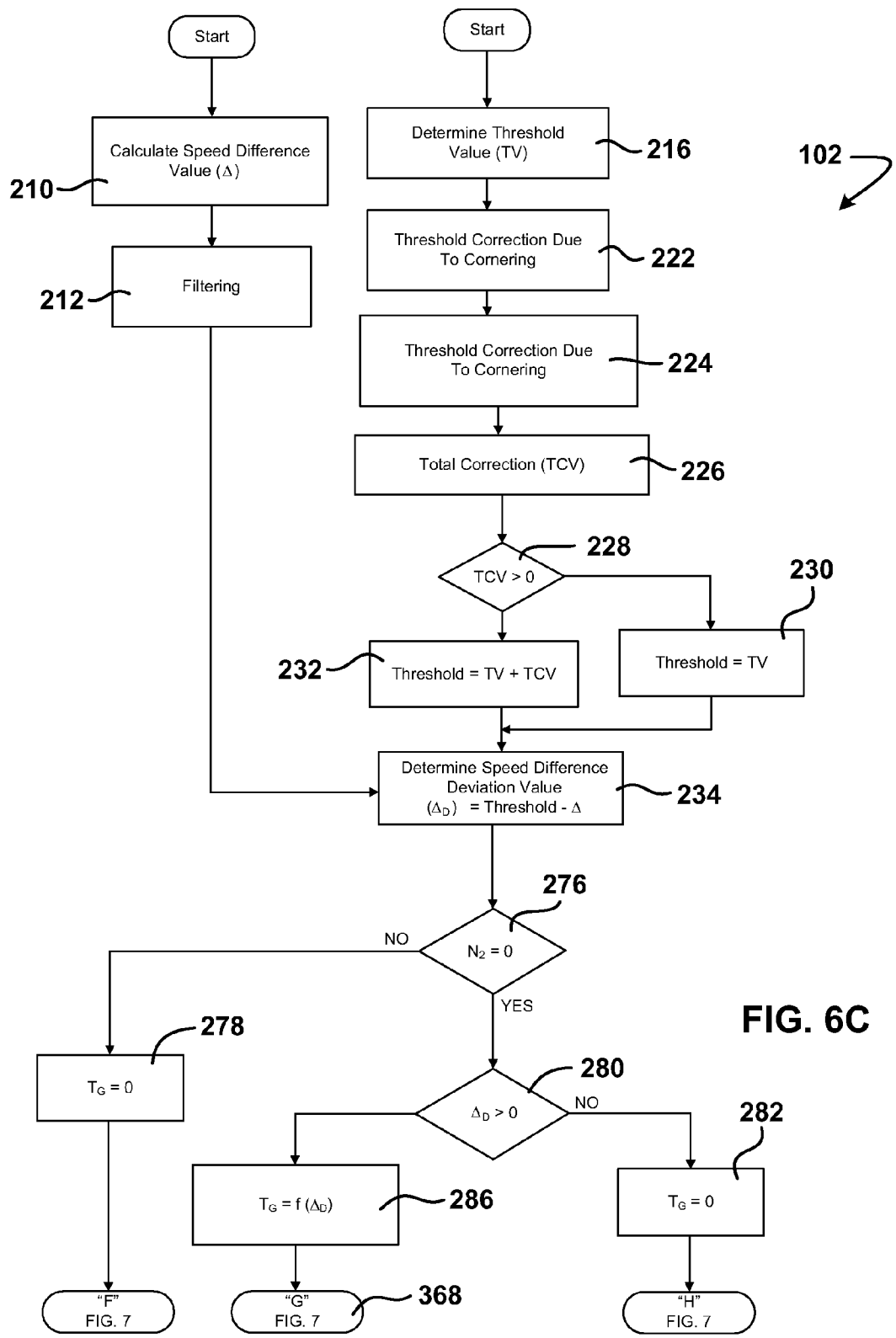

During operation in the on-demand four-wheel drive mode, ECU 48 functions to determine an electric command signal (I) that is supplied to controlled device 70 of power-operated clutch actuator 42 for causing the target clutch torque, hereinafter referred to as the command torque (T), to be transmitted by transfer clutch 40 to front output shaft 34. Pursuant to the present invention, ECU 48 includes two separate slip control programs or modules, each of which is operable to determine the command torque value (T). Specifically, ECU 48 includes a first or "drive" slip control module and a second or "coast" slip control module. The flow diagrams of functional blocks or method steps associated with the drive slip control module are identified by reference numeral 100 and are shown in FIGS. 5A through 5C. Likewise, the flow diagrams of functional blocks or method steps associated with the coast slip control module are identified by reference numeral 102 and are shown in FIGS. 6A through 6C. Basically, drive slip control module 100 is functional when rear driveline 14 is slipping relative to front driveline 16 and powertrain 12 is supplying positive (i.e., "drive") torque to transfer case 18. In contrast, coast slip control module 102 is functional when powertrain 12 is supplying negative ("coast") torque during an engine coast/brake condition or during braking of the vehicle. The mathematically greater command torque value (T) determined from drive slip control module 100 and coast slip control module 102 is used to determine the command signal value (I).

Referring initially to FIGS. 5A and 5B, the functional sequence of operations associated with drive slip control module 100 for increasing the command torque value (T) will be described. In block or step 110, the actual speed difference ($\Delta$) between the rear axle and the front axle is calculated by subtracting the average wheel speed of front wheels 30 (detected by wheel sensors 80) from the average wheel speed of rear wheels 24 (detected by wheel sensors 82). Block or step 112 shows that the speed difference ($\Delta$) is filtered with a suitable $1^{st}$ order filter. If wheel sensors are not available, speed information can be measured with speed sensors associated with front output shaft 34 and rear output shaft 28. Next, the value of speed difference ($\Delta$) is used in a derivation process, as indicated by block or step 114, to establish a gradient value (d$\Delta$/dt) which is indicative of the slope of a speed difference versus time plot. In this regard, a number of exemplary plots depicting speed difference versus time relationships are provided for further discussion and are shown in FIGS. 8A through 8F.

Figure 9A:
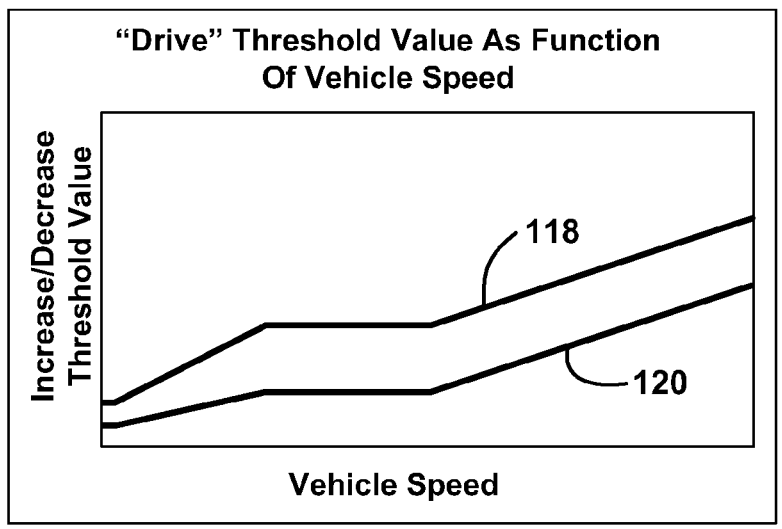
FIGS. 9A and 9B illustrates exemplary plots of threshold values as a function of vehicle speed that are utilized in association with the drive and coast slip control programs.

Concurrent with determination of the actual speed difference value ($\Delta$), block or step 116 indicates that a speed difference threshold value (TV) is determined. FIG. 9A illustrates an exemplary graph of speed difference threshold values (TV) that vary as a function of the vehicle speed. Specifically, an upper plot 118 is used for torque increase calculations while a lower plot 120 is used for torque decrease calculations. Blocks or steps 122 through 126 are provided to determine a threshold correction value (TCV). In particular, block or step 122 represents determination of a first threshold correction value based on specific cornering characteristic while block or step 124 represents determination of a second threshold correction value based on detected differences in the size of the wheels. Block or step 126 indicates that the first and second threshold correction values are added to define the total threshold correction value (TCV).

Block or step 128 indicates a determination as to whether the threshold correction value (TCV) is positive or negative. If the threshold correction value (TCV) is positive, then block or step 130 indicates that the speed difference Threshold value is set equal to the speed difference threshold value (TV) originally selected at block or step 116 for use in subsequent calculations. In contrast, if the threshold correction value (TCV) is negative, then block or step 132 that indicates the threshold correction value (TCV) is subtracted from the speed difference threshold value (TV) selected at block or step 116 to define a revised speed difference Threshold value. Finally, block or step 134 indicates calculation of the difference between the speed difference value ($\Delta$) and the speed difference Threshold value for defining a speed deviation value ($\Delta_D$). In essence, this deviation value is the distance between the "threshold increase"line and a corresponding point on the speed difference curve shown in FIGS. 8A through 8F.

Figure 10:
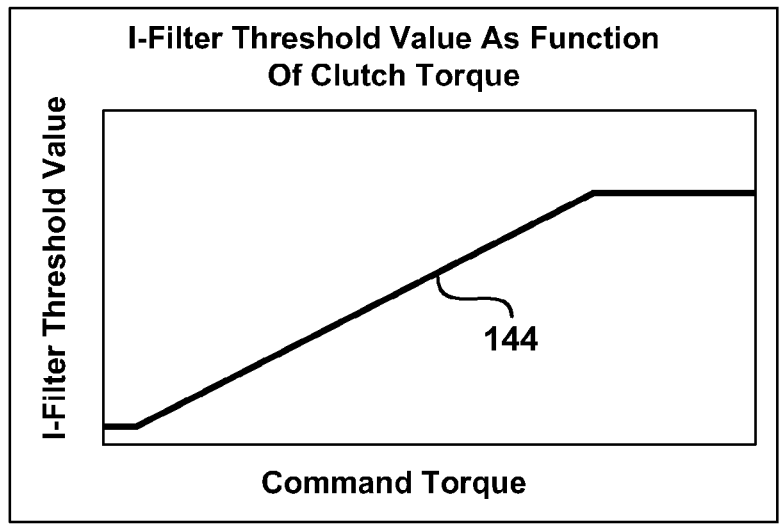
FIG. 10 is an exemplary plot of the threshold values for an I-Filter as a function of command torque utilized with the drive slip control program.

Referring now to FIG. 5B, block or step 140 represents integration processing of the deviation value ($\Delta_D$) applied as an I-Filter to eliminate the effect torsional wind-up has on output shafts 28 and 34 which is included in the speed signals from, for example, wheel sensors 80 and 82. The output from block or step 140 is an I-Filter value and an I-Filter threshold value. Block or step 142 represents a determination of whether an I-Filter threshold value (FTV) has been reached. FIG. 10 illustrates a plot 144 that is indicative of an exemplary relationship between the I-Filter value and the command torque value (T) from the previous computation cycle. Specifically, once the speed difference value ($\Delta_D$) exceeds the threshold value, the deviation values ($\Delta_D$) Of each consecutive computational time period are summed. Below a specific sum value, the deviation value ($\Delta_D$) is set equal to zero. However, once this sum value is exceeded, calculation of a torque gradient is permitted. If the I-Filter value for a target command torque value is below plot 144, then the value of the deviation ($\Delta_D$) is set to zero, as indicated by block or step 146. As will be detailed, setting the deviation value ($\Delta_D$) to zero results in no torque increase being requested, as indicated by portion 148 of the clutch torque v. time plot shown in FIG. 8A. If the speed information is measured directly from the output shafts, the use of the I-Filter may not be necessary.

Thereafter, drive slip control module 100 enters a timer/counter routine. As seen, block or step 150 is a decision point. If the value of the deviation ($\Delta_D$) is positive, a drive torque timer value ($t_D$) is reset to zero as indicated by block or step 152. If the value of the deviation ($\Delta_D$) is zero, such as set by block 146, then the timer is incremented, as indicated by block or step 154. The output of the timer setting function is then compared to a predetermined holding time value ($t_H$) as indicated by block or step 156. In one exemplary system, holding time ($t_H$) is set to equate to five or more computational cycles. If the timer value ($t_D$) is less than the holding value ($t_H$), then a first factor $N_1$ is assigned a value of one, as shown in block or step 158. If the timer value ($t_D$) has exceeded the holding time value ($t_H$), then the first factor $N_1$ is assigned a value of zero, as indicated by block or step 160.

Figure 7:
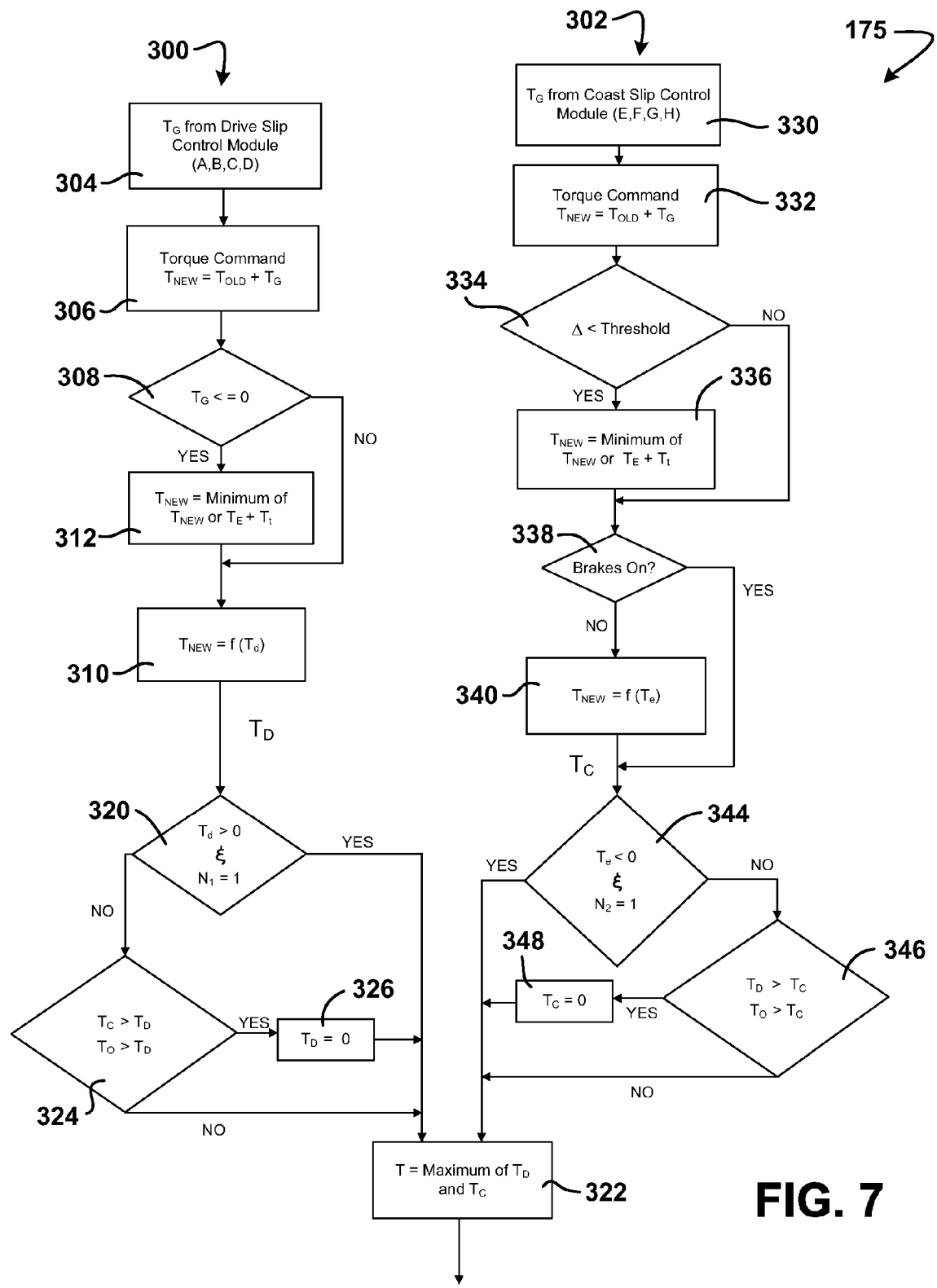
FIG. 7 is a flow chart depicting a torque control program associated with the drive and coast slip control programs.
Figure 11:
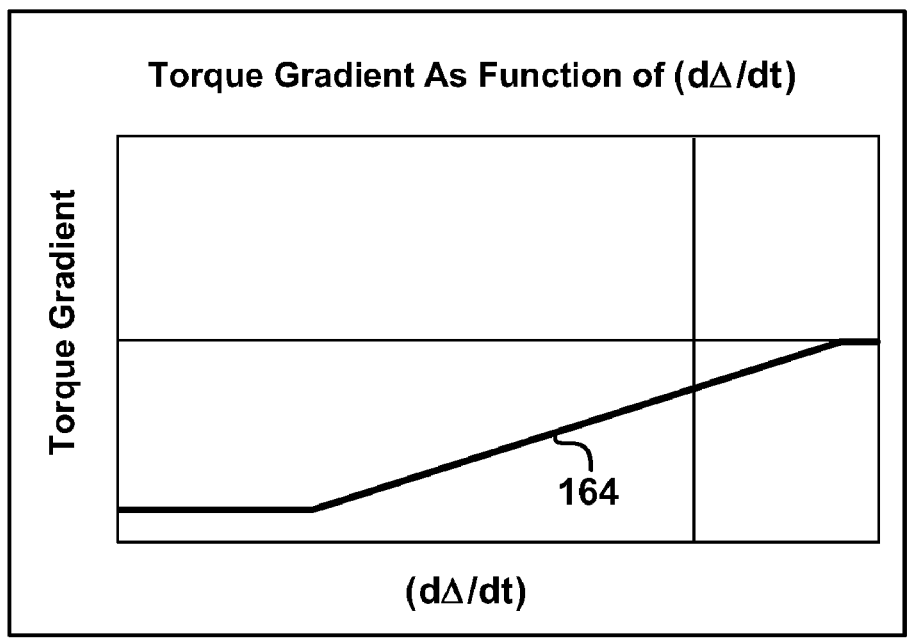
FIGS. 11 through 14 are exemplary plots used to determine a torque gradient value in association with the drive slip control program.
Figure 12:
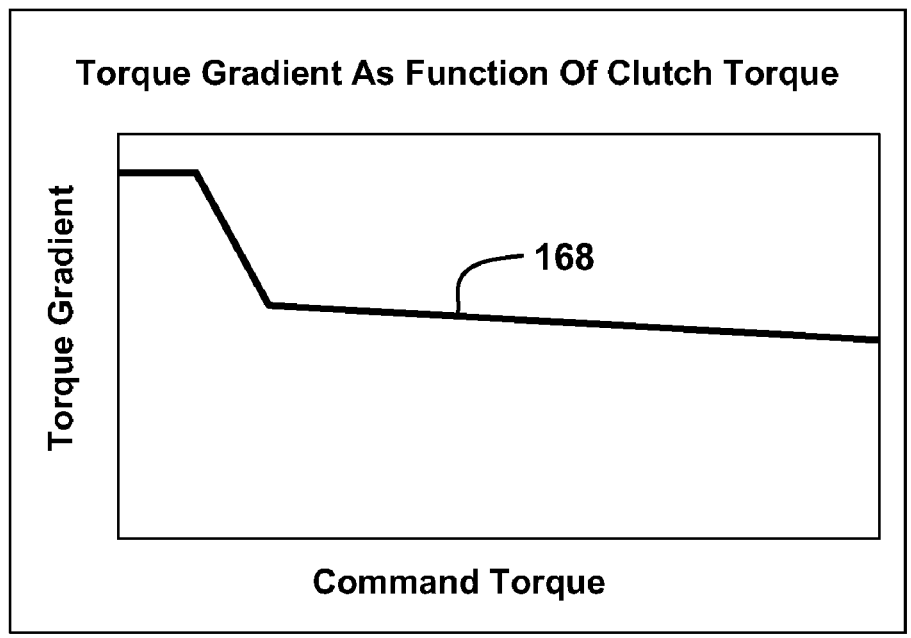

Based on these determinations, drive slip control module 100 moves to determination of a torque gradient value ($T_G$) that will be added to the previous clutch torque level. Under drive torque conditions, the torque increase per computational cycle depends on the last clutch torque value ($T_{OLD}$) such that the new command torque value (T) is equal to ($T_{OLD}$) +($T_G$). Two distinct gradient determinations are conducted to determine the value of the torque gradient ($T_G$). First, as indicated by block or step 162, a first portion ($T_{G1}$) Of torque gradient ($T_G$) is determined as a function of the gradient value (d$\Delta$/dt) calculated at block 114. The value of this first gradient portion ($T_{G1}$) is selected from a predetermined relationship shown, for example, as plot 164 in FIG. 11. A second portion ($T_{G2}$) of torque gradient ($T_G$), as indicated by block or step 166, is determined as a function of the last command torque value from the previous computation cycle, as shown by exemplary plot 168 in FIG. 12. Block or step 170 determines whether the value of the total torque gradient value ($T_G$) is positive or negative. If the total torque gradient value ($T_G$) is positive then its value is set equal to the sum of the first and second gradient portions ($T_{G1}$) and ($T_{G2}$), as indicated by block 172. Pursuant to block or step 174, if the torque gradient value ($T_G$) is less than zero, then its value is set to zero. Thereafter, the torque gradient value ($T_G$) is used in a torque control program or routine 175, the functional blocks or steps of which are shown in FIG. 7.

Figure 13:
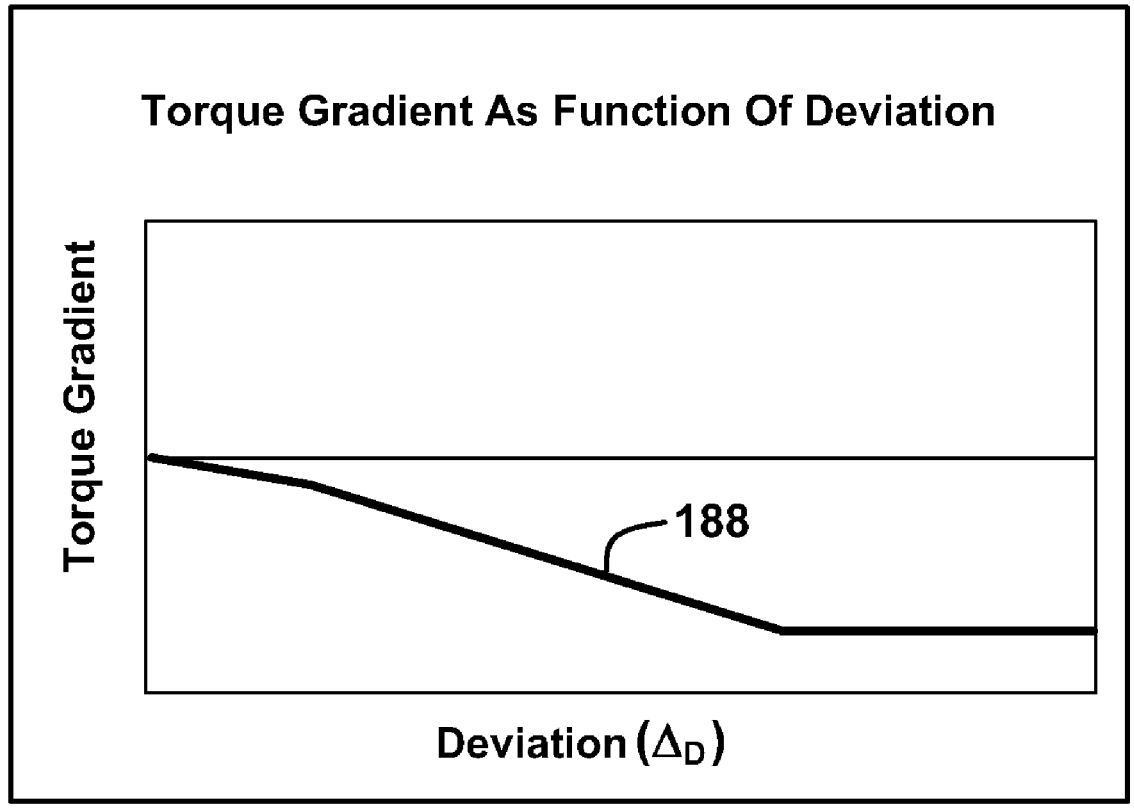
Figure 14:
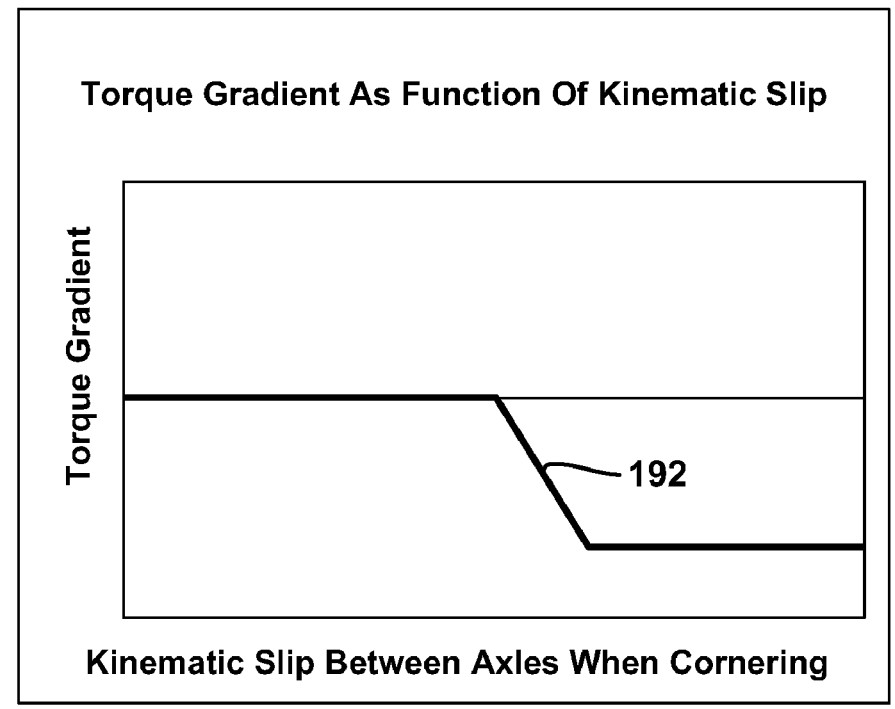

Referring now to FIG. 5C, the control sequence associated with calculating the torque gradient value ($T_G$) during a torque decrease situation within drive slip control module 100 is shown to include many blocks or steps that are similar to those previously described for calculating the torque gradient during a clutch torque increase situation. As such, common reference numerals and used to identify the common control blocks or steps. As seen, the value of a deviation ($\Delta_D$) is again calculated based on speed difference ($\Delta$) and a threshold value selected from steps 130 or 132. Thereafter, the first factor value ($N_1$) set in FIG. 5B is used in a decision point indicated by block or step 176. If the first factor ($N_1$) was set equal to one (step 158) then block or step 178 indicates that the torque gradient value ($T_G$) value is set equal to zero. If first factor ($N_1$) was set to zero (step 160), then block or step 180 indicated a decision point as to whether the value of the deviation ($\Delta_D$) is greater than zero. Block or step 182 indicates that the value of the torque gradient ($T_G$) is set to zero if the deviation value ($\Delta_D$) is less than or equal to zero. In contrast, if the deviation value ($\Delta_D$) calculated in block 134 of FIG. 5C is positive, then the value of the torque gradient ($T_G$) is selected from the minimum value of two gradient determinations, as indicated by block or step 196. Specifically, block or step 186 indicates determination of the torque gradient value as a function of the deviation value ($\Delta_D$), as selected from the exemplary relationship shown as plot 188 in FIG. 13. As seen, the torque gradient value increases as a function of increasing deviation values. In contrast, block or step 190 indicates determination of the torque gradient value as a function of kinematic slip, as selected from the exemplary plot 192 shown in FIG. 14. Functional block or step 194 indicates calculation of the kinematic slip value utilizing predefined relationships based on, inter alia, vehicle speed, curve radius and vehicle wheel base.

Referring now primarily to FIGS. 6A and 6B, the functional blocks or method steps of coast slip control module 102 directed to increasing the clutch torque will be described. In block or step 210, the actual speed difference ($\Delta$) between rear output shaft 28 and front output shaft 30 is calculated by subtracting the average wheel speed of rear wheels 24 from the average wheel speed of front wheel 30. Block or step 212 shows filtering of the speed difference ($\Delta$) with a $1^{st}$ order filter. Next, the value of the speed difference ($\Delta$) is used in a derivation process, as indicated by block or step 214, to establish a gradient value ($d\Delta/dt$).

Figure 9B:
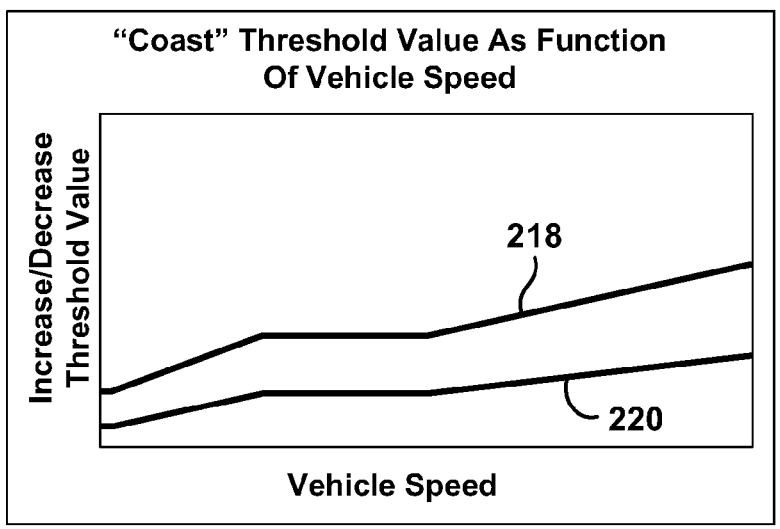

Concurrent with determination of the speed difference value ($\Delta$), block or step 216 indicates that a speed difference threshold value (TV) is determined. FIG. 9B illustrates an exemplary graph of speed difference threshold values that vary as a function of the vehicle speed with a first plot 218 used for torque increase calculations and a second plot 220 used for torque decrease calculations. Blocks or steps 222 through 226 provide for determination of a threshold correction value (TCV). Functional block or step 222 represents determination of a first threshold correction value based on specific vehicle cornering characteristic while block or step 224 represents determination of a second threshold correction value based on wheel size differences. Block or step 226 indicates that the threshold correction value (TCV) is the sum of the first and second correction values. As indicated by block or step 228, if the value of the total threshold correction (TCV) is negative, then block or step 230 indicates that the speed difference Threshold value is set equal to the threshold value (TV) selected at step 216. In contrast, if the threshold correction value (TCV) is positive, then block or step 232 indicates that the speed difference Threshold value is the sum of the threshold value (TV) from block 216 and the corrected threshold value (TCV) from block 226. Finally, step 234 indicates calculation of the difference between the speed difference value ($\Delta$) and the Threshold value for determining a speed deviation value ($\Delta_D$).

Referring now to FIG. 6B, coast slip control module 102 provides a timer/counter routine. As seen, block 250 is a decision point regarding the magnitude of the speed deviation ($\Delta_D$). If the deviation value is positive, a coast torque timer value ($t_C$) is reset to zero as indicated by block or step 252. If the deviation value ($\Delta_D$) is zero or negative, then the timer is incremented as indicated by block or step 254. The output of the timer routine is then compared to a preset holding time ($t_H$) as indicated by block or step 256. If the coast timer value ($t_C$) is less than the holding time value ($t_H$), then a second factor ($N_2$) is assigned a value of one, as indicated by block or step 258. In contrast, if the coast timer value ($t_C$) has exceeded the holding time ($t_H$), then the second factor $N_2$ is assigned a value of zero, as indicated by block or step 260.

Figure 15:
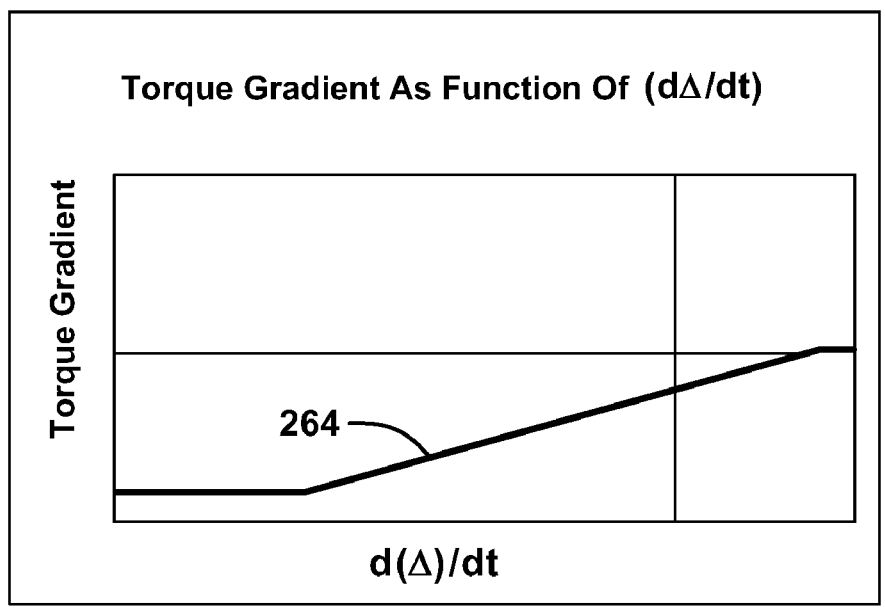
FIGS. 15 through 17 are exemplary plots used to determine a torque gradient value in association with the coast slip control program.
Figure 16:
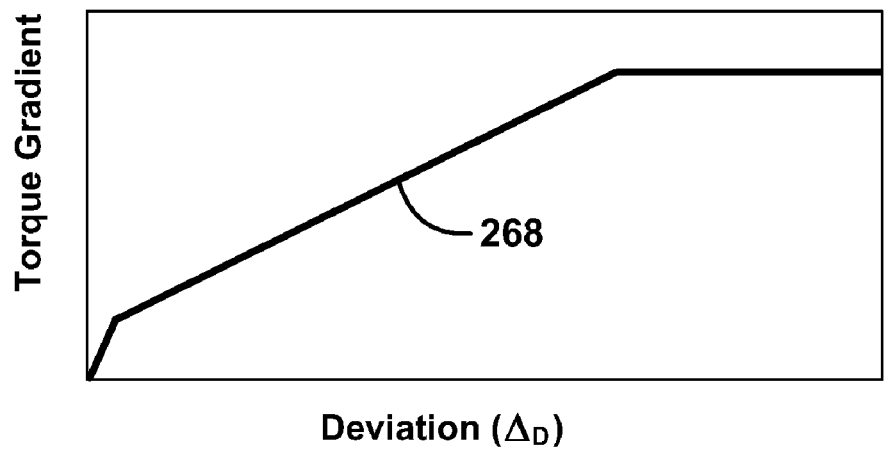

Coast slip control module 102 thereafter functions to determine the value of the torque gradient ($T_G$) to be added to the previous command torque value. Two different gradient determinations are conducted to calculate the value of ($T_G$). First, as indicated by block or step 262, a first portion ($T_{G3}$) of torque gradient ($T_G$) is determined as a function of the gradient value ($d\Delta/dt$) calculated at step 214. This first gradient portion ($T_{G3}$) is selected from an exemplary plot 264 shown in FIG. 15. Next, a second portion ($T_{G4}$) is determined, as indicated by block or step 266, as a function of the deviation value ($\Delta_D$) from block 234. This second portion ($T_{G4}$) is determined from the exemplary plot 268 shown in FIG. 16. Block or step 270 determines whether the total torque gradient value ($T_G$) =($T_{G3}$)+($T_{G4}$) is positive. If yes, the torque gradient value ($T_G$) is set equal to the sum of the two gradient portions, as indicated by block or step 272. In contrast, block or step 274 indicates that the torque gradient value ($T_G$) is set equal to zero if the sum of the two portions is negative. Thereafter, the value of the torque gradient ($T_G$) is used in the torque control routine shown in FIG. 7.

Figure 17:
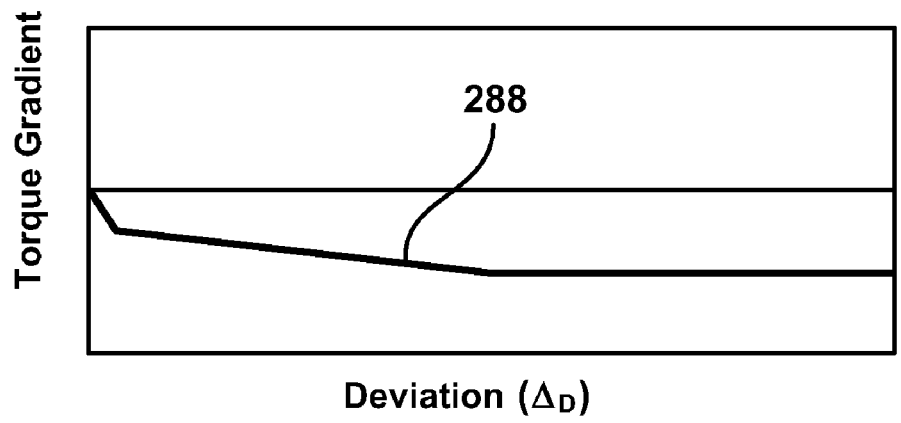

Referring now to FIG. 6C, the control sequence associated with calculating a decreasing torque gradient value ($T_G$) during operation with coast slip control module 102 is shown to include many functional blocks or steps that are similar to those previously described. As such, common reference numerals are again used to identify common control steps. As seen, the deviation value ($\Delta_D$) is determined between speed difference ($\Delta$) and the threshold value selected from steps 230 or 232. Thereafter, the value of second factor ($N_2$) is used at decision point 276. If the value of second factor ($N_2$) does not equal zero, then block or step 278 indicates that the value of the torque gradient ($T_G$) is set equal to zero. If the second factor value ($N_2$) value equals zero, then block or step 280 indicates determination of whether the deviation value ($\Delta_D$) is positive or negative. If the deviation value ($\Delta_D$) is zero or negative, the torque gradient ($T_G$) is set equal to zero as indicated by block or step 282. In contrast, if the deviation value ($\Delta_D$) is positive, a torque gradient value is determined utilizing an exemplary plot 288 shown in FIG. 17, as indicated by functional block or step 286. As seen, the torque gradient values established in blocks or steps 278, 282 and 286 are used in the torque control program shown in FIG. 7.

Referring now to FIG. 7, torque command program 175 is shown to include a drive command routine 300 and a coast command routine 302. Drive command routine 300 utilizes the torque gradient value ($T_G$) established by drive slip control module 100 as indicated by block or step 304. The torque gradient value is used to determine a new command torque value ($T_{NEW}$) as the sum of the last command torque value ($T_{OLD}$) and the torque gradient value ($T_G$), as indicated by block or step 306. Next, a determination is made as to whether the torque gradient value ($T_G$) is less than or equal to zero, as indicated by block or step 308. If the torque gradient value is positive, the new command torque value ($T_{NEW}$) bypasses a "correction" function and is submitted to a torque limiting function indicated by block or step 310. If the torque gradient value is negative or equal to zero, then the new command torque value ($T_{NEW}$) from step 306 is submitted to the correction function indicated by block or step 312. The correction function is operable to set the value of the new command torque ($T_{NEW}$) to the minimum of the command torque value calculated in step 306 or the sum of an "estimated" command torque value ($T_E$) and a predetermined torque tolerance value ($T_t$). The estimated command torque value ($T_E$) is based on an actual clutch torque value that is estimated by software or programs associated with ECU 48 as a function of the actuator position detected by position sensor 92.

Figure 18:
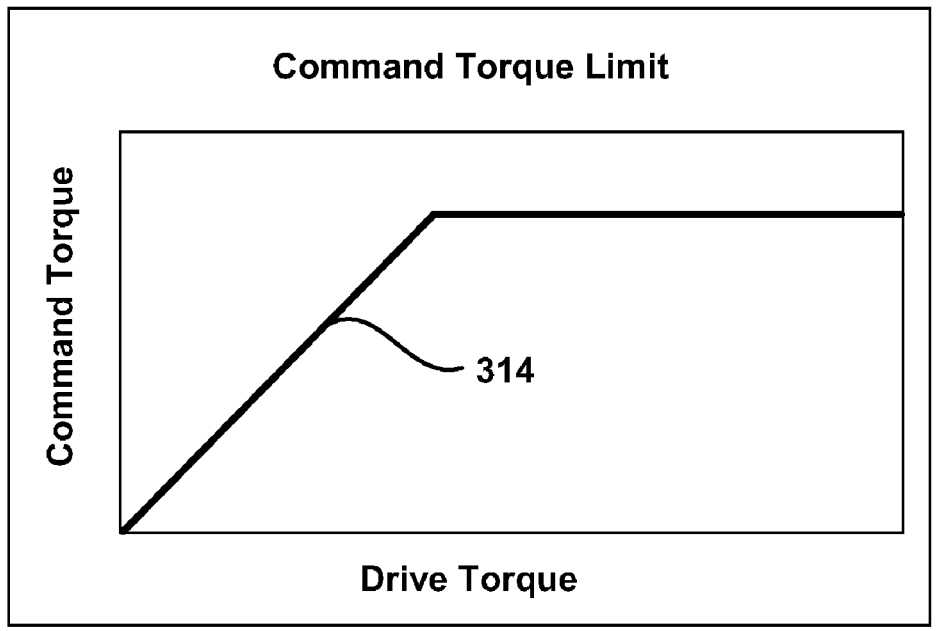
FIGS. 18 and 19 are exemplary plots of clutch torque limits used in association with the drive and coast slip control programs.

The value of the command torque ($T_{NEW}$) is then submitted to the torque limiting function of block or step 310 for comparison to the actual engine drive torque ($T_d$). FIG. 18 illustrates an exemplary plot 314 of the maximum command torque value ($T_{NEW}$) as a function of the drive torque value ($T_d$). Thus, if the calculated command torque is greater than the corresponding drive torque, the command torque value is reduced to a maximum permissible value. As seen, the value of the torque command outputted from limit function 310 is now identified as a "Drive" command torque ($T_D$).

Drive command routine 300 is further shown to include a block or step 320 wherein the value of the drive torque ($T_d$) and first factor value ($N_1$) are considered. If positive drive torque is generated by engine 20 such that ($T_d$) has a value greater than zero and the first factor ($N_1$) has a value set equal to one (block 158 of FIG. 5B), then the value of the Drive command torque ($T_D$) is outputted directly to output block or step 322. If one of these conditions, however, is not met, then a determination is made at block or step 324 as to whether the Drive command torque value ($T_D$) is less than a "Coast" command torque value ($T_C$) calculated from coast command routine 302 and/or any "other" clutch torque requirement ($T_O$) generated by another controller routine (i.e., variable pre-torque or ESP program) associated with the vehicle. Specifically, if the value of the torque requirement from any of these controller routines is greater than the Drive command torque value ($T_D$), then the Drive command torque ($T_D$) is set equal to zero, as indicated at block or step 326. In contrast, if the value of the Drive command torque value ($T_D$) is greater than the Coast command torque ($T_C$) and the torque requirements ($T_O$) from the other controller routines, then the Drive command torque value ($T_D$) is outputted to output block 322.

Figure 19:
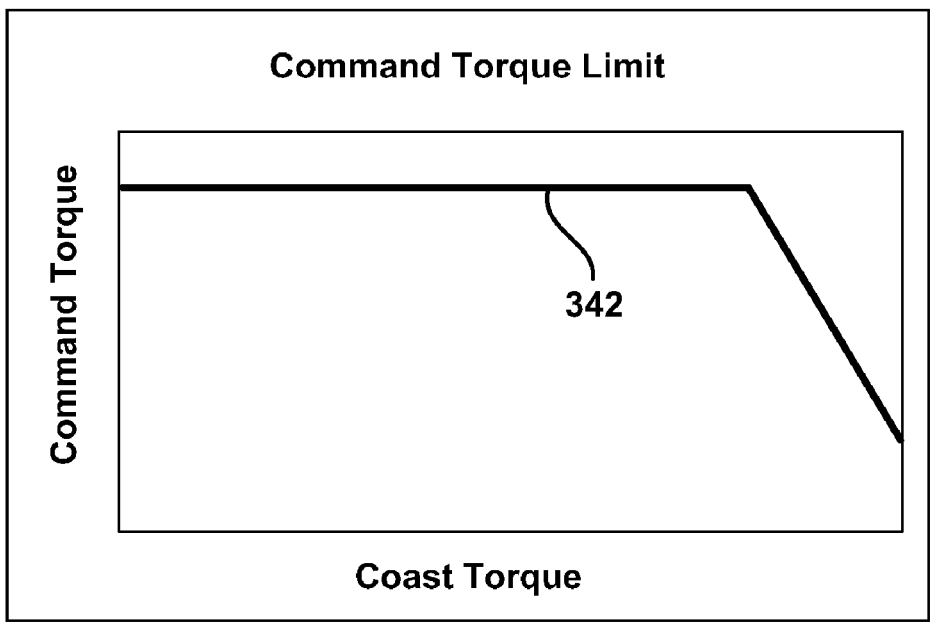

With continued reference to FIG. 7, coast command routine 302 is shown to utilize the torque gradient values ($T_G$) established by coast slip control module 102 as indicated by block 330. Specifically, the torque gradient values are used again to determine a new command torque value ($T_{NEW}$) as the sum of the last command torque ($T_{OLD}$) and the torque gradient ($T_G$), as indicated by block or step 332. Next, a determination is made at block or step 334 as to whether the speed difference value (Δ) is less than the coast Threshold value. As recalled, these values were calculated during the coast slip control module operations shown in FIG. 6A. If not, the new torque command value ($T_{NEW}$) bypasses a correction function indicated by block or step 336 and is submitted to a brake status inquiry at block or step 338. Correction function 336 is identical to correction function 312 of drive command routine 300 in that it sets the new command torque value ($T_{NEW}$) at the minimum of the value outputted from block 332 or the sum of the estimated command torque value ($T_E$) and a torque tolerance value ($T_t$). At block or step 338, a determination is made as to the brake status. If the brakes are applied, the new command torque value ($T_{NEW}$) bypasses a torque limiting function indicated by block or step 340 and is referred to as the "Coast" command torque ($T_C$). However, if the brakes are not applied, torque limit function 340 is operable to compare the new command torque value ($T_{NEW}$) with the actual engine coast torque value ($T_e$). FIG. 19 illustrates an exemplary plot 342 of the maximum command torque as a function of actual coast torque during an engine coast condition.

Coast command routine 302 is further shown to include a block or step 344 wherein the magnitude of the engine coast torque ($T_e$) and the second factor ($N_2$) are considered. Specifically, if engine 20 is operating in a coast condition such that the engine torque value is less than zero and the second factor ($N_2$) has a value set equal to one (block 258 of FIG. 6B), then the value of the Coast command torque ($T_C$) is outputted directly to output block 322. If one of these conditions, however, is not met, then a determination is made at step 346 whether the value of the Drive command torque ($T_D$) or any other clutch torque requirement ($T_O$) from another controller routine is greater than the Coast command torque value ($T_C$). If yes, then the Coast command torque value ($T_C$) is set equal to zero as indicated by block or step 348. In contrast, if the Coast command torque value ($T_C$) is greater than the Drive command torque ($T_D$) and the other torque controller requirements ($T_O$), then the Coast command torque ($T_C$) is outputted to output block 322.

The value of the target command torque (T) is selected as the maximum of the Drive command torque value ($T_D$) and the Coast command torque value ($T_C$) as shown in output block or step 322 of FIG. 7. This target command torque (T) is then used for calculating the corresponding electric control signal (I) that is outputted to controlled device 70 for causing movement of its output member to a position calculated to generate the desired clutch torque. The actual clutch torque is proportional to the target command torque. As noted, accurate control of the position of output member of controlled device 70 permits fine control over clutch engagement to permit smooth torque transfer characteristics. A calibration process is provided at the start of each ignition cycle to correlate the position of the moveable output component of controlled device 70 with the clutch torque generated.

Figure 8A:
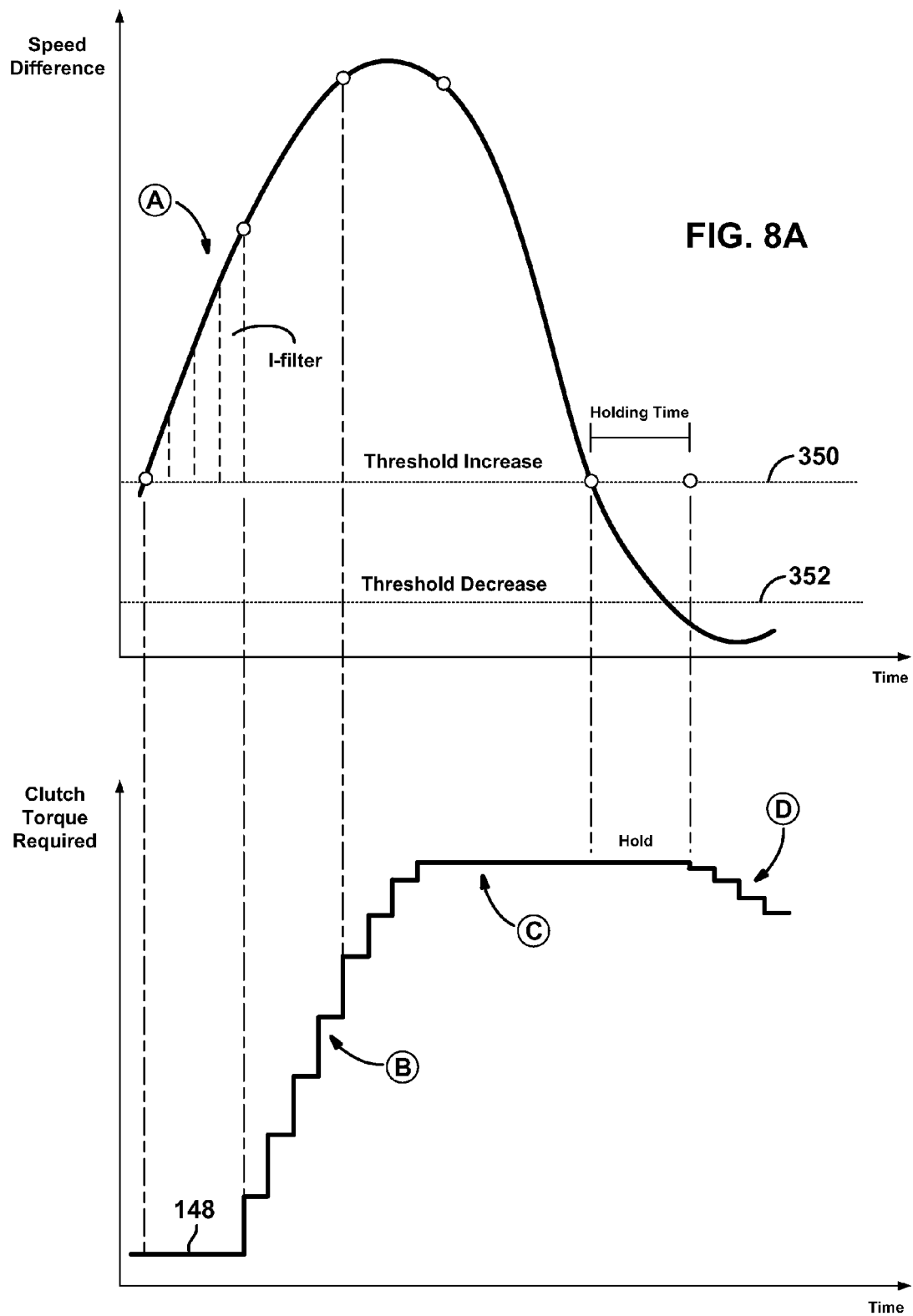
FIG. 8A through 8F are exemplary graphs showing correlations between speed difference and clutch torque relative to time for the drive and coast slip control programs.
Figure 8B:
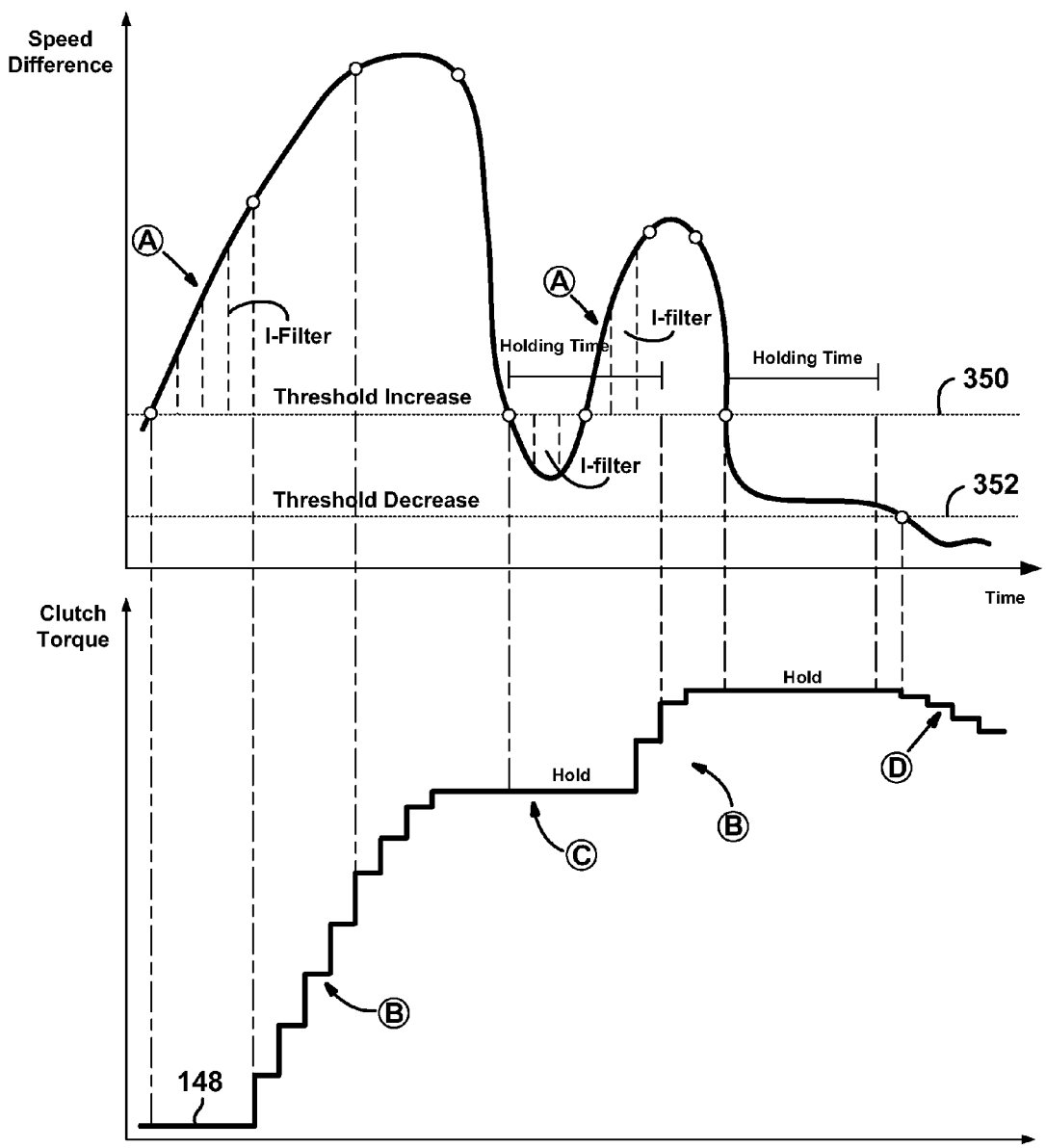
Figure 8C:
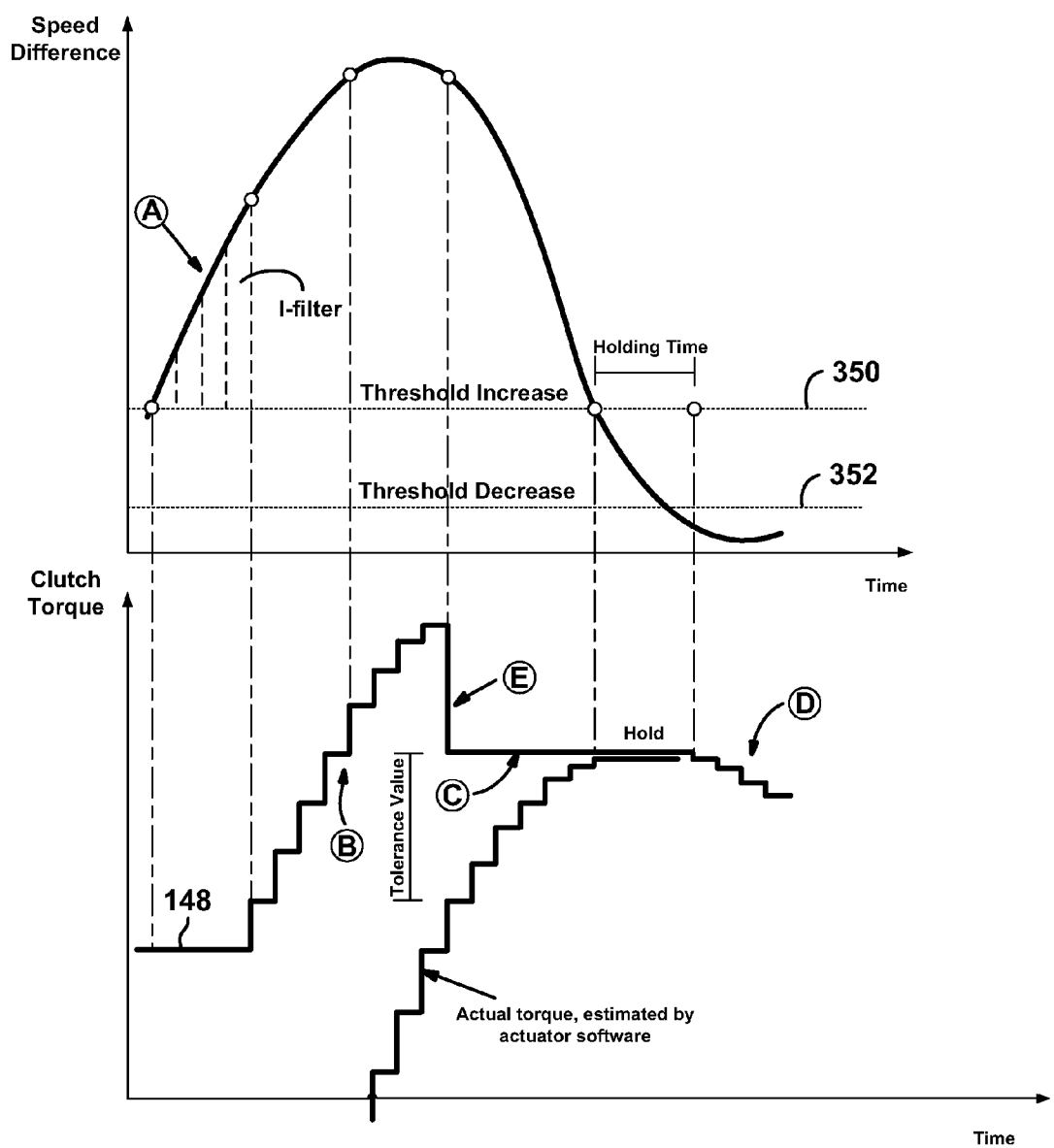
Figure 8D:
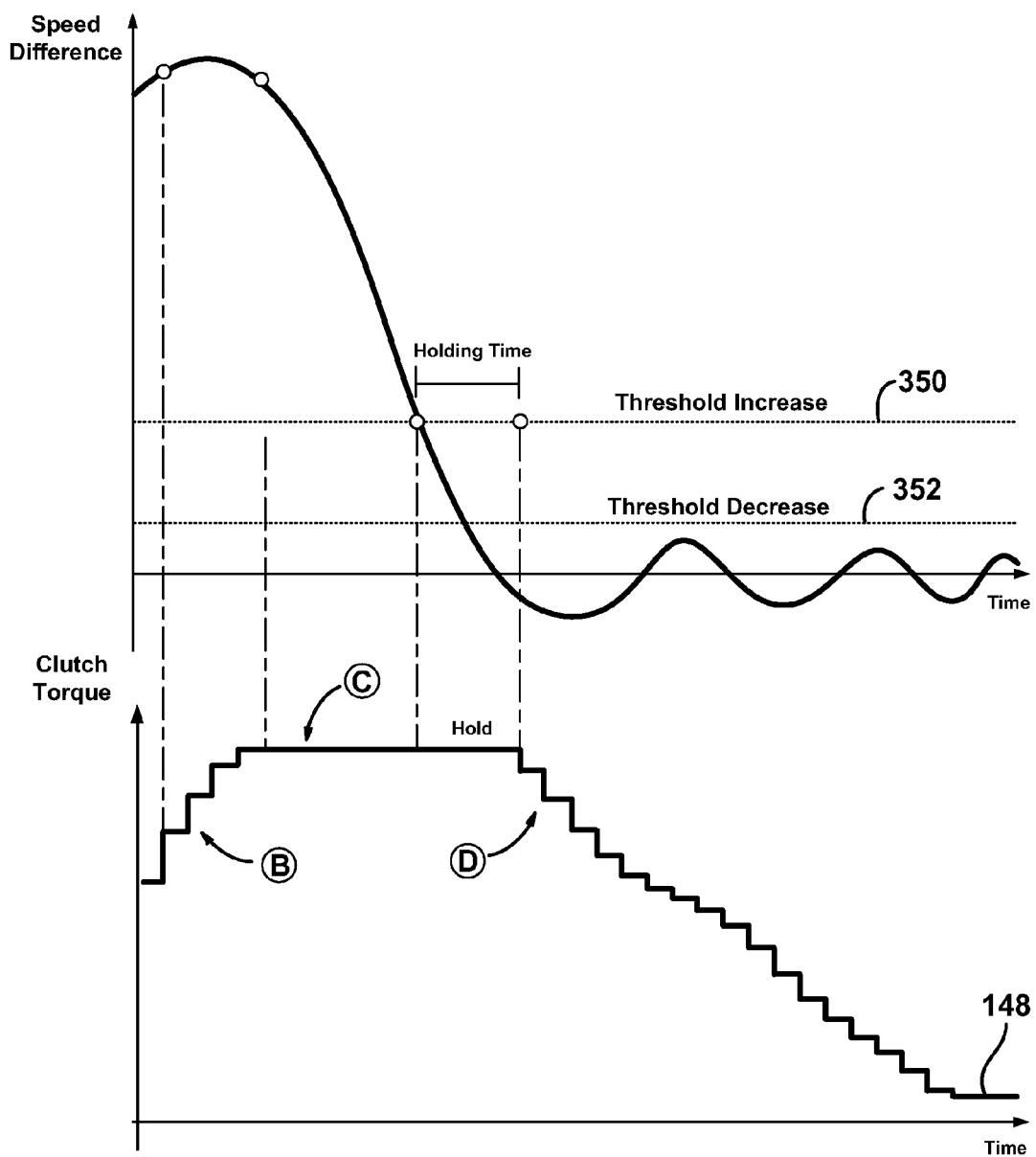
Figure 8E:
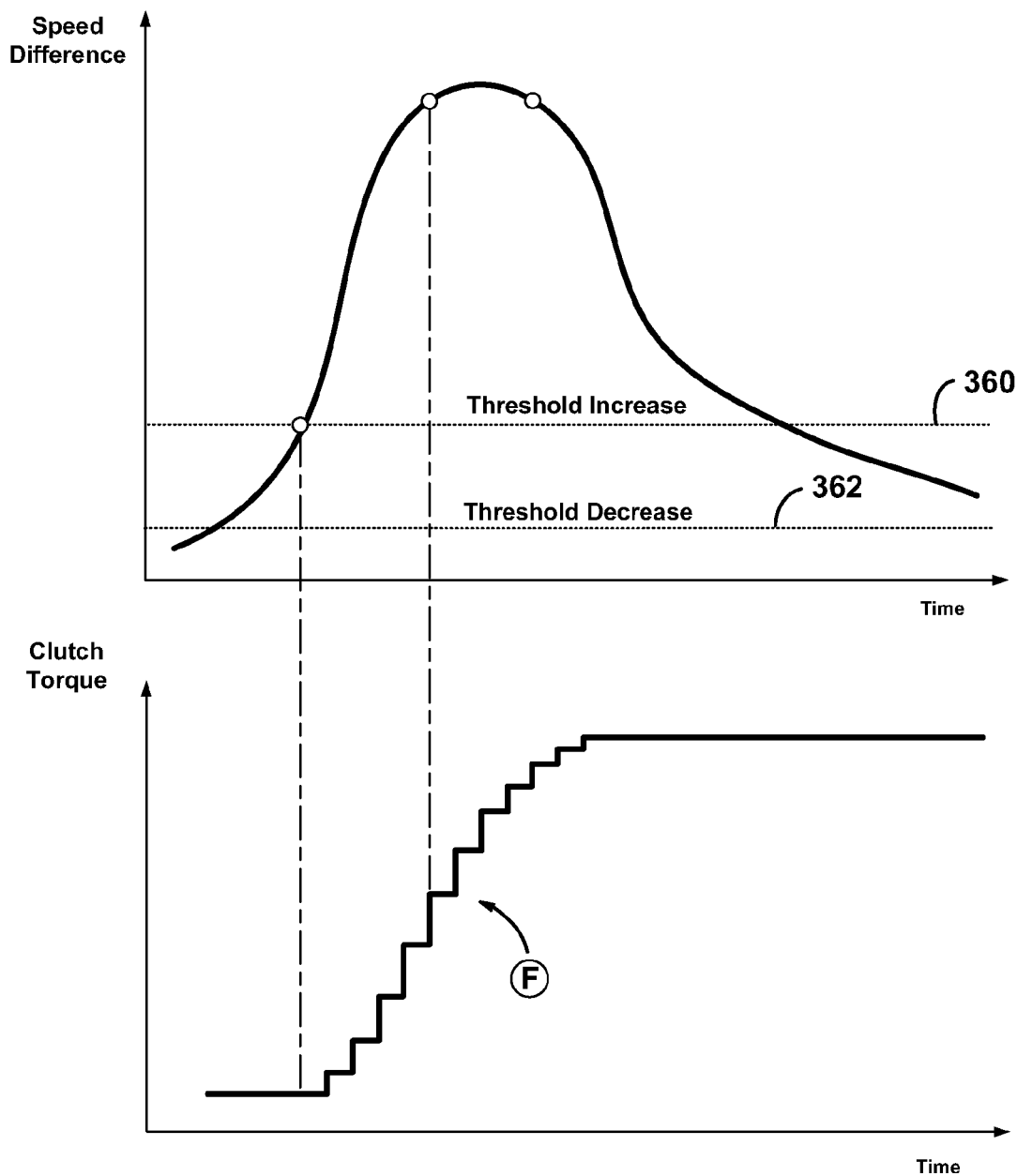
Figure 8F:
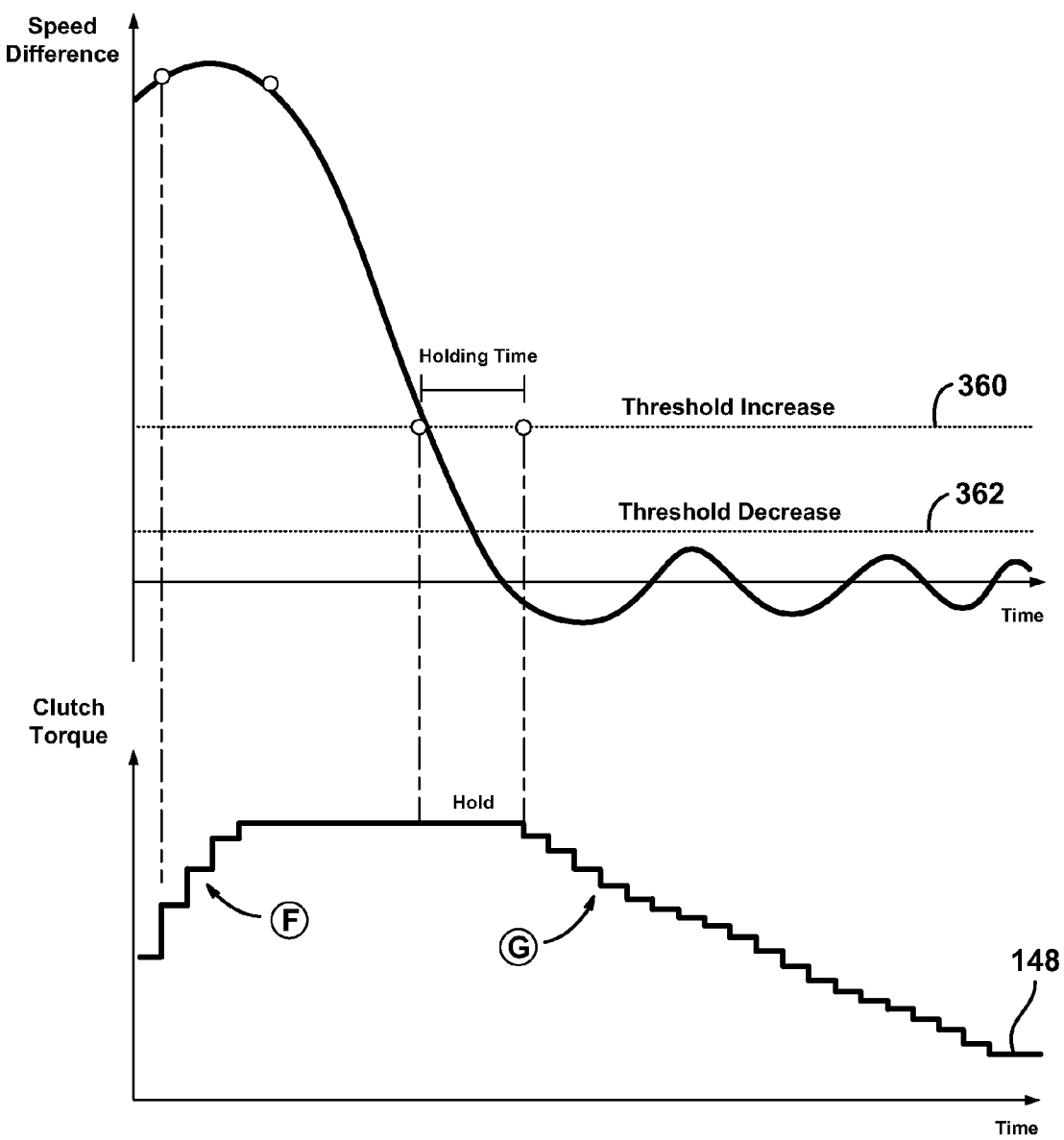

The exemplary relationships shown in FIGS. 8A through 8D are indicative of the clutch control established by drive slip control module 100 while FIGS. 8E and 8F illustrates the clutch control dictated by coast slip control module 102. As seen, each graph shows the value of the command torque (T) generated in response to variations in the speed difference value (Δ) during a series of consecutive computational cycles. Moreover, each graph identifies the threshold increase and decrease values, as indicated by lines 350 and 352, respectively above and below which torque gradients are calculated. As noted, these threshold values are primarily determined as a function of vehicle speed with modifications made thereto due to the kinematic requirements for cornering and/or tire size deviations.

Referring initially to FIG. 8A, the area "A" of the speed difference versus time plot indicates filtering of the deviation value ($Δ_D$) pursuant to block 140 of FIG. 5B and comparison of the I-Filter value to the I-Filter threshold value (FTV) indicated by block 142. Portion 148 of the clutch torque plot indicates that its value is maintained at the pre-torque level, that is, the torque gradient value ($T_G$) is set to zero. However, once the I-Filter threshold value (FTV) is reached, a positive torque gradient value ($T_G$) is calculated and added to the previous command torque value ($T_{OLD}$) to establish the new command torque ($T_{NEW}$). Area "B" of the clutch torque versus time plot indicates determination of the torque gradient value outputted at block or step 354 of FIG. 5B. FIG. 8A illustrates at area "C" that a constant torque is maintained in response to decreasing speed differences until the speed differential value (Δ) falls below the Threshold decrease value indicated by line 352 and the hold time is reached. Note that the hold time is initiated once the speed difference value falls below the Threshold increase line 350. The value of the torque gradient decrease, as indicated by area "D", results from the determination outputted at block or step 356 of FIG. 5C.

FIG. 8B is similar to FIG. 8A except that it illustrates a second torque build-up due to a second increase in the speed difference that is sufficient to require calculation of a torque gradient. This positive torque gradient is added to the constant torque level shown at area C. FIG. 8C is likewise similar to FIG. 8A except that area "E" of the clutch torque versus time plot indicates that the command torque value (T) is reduced due to the torque limiting function indicated by block 312 of FIG. 7 to a value determined from the plot shown in FIG. 18. Finally, FIG. 8D illustrates a series of torque gradient decreases that continue until the pre-torque level 148 is reached. These negative torque gradient values are caused by the speed difference value (Δ) being maintained below the Threshold decrease line 352. The actual values for the negative torque gradients are varied due to block 196 of FIG. 5C indicating that the minimum value of two different gradient calculations is selected for each computational cycle.

As mentioned, the exemplary relationships shown in FIGS. 8E and 8F are generated from coast slip control module 102. Specifically, the torque gradient increase plot shown in FIG. 8E is controlled pursuant to the functional steps disclosed in FIGS. 6A and 6B while the torque gradient decrease plot of FIG. 8F is controlled pursuant to the functional steps disclosed in FIG. 6C. Lines 360 and 362 indicate the Threshold increase and decrease values, respectively, associated with coast slip control module 102. Area "F" of the clutch torque versus time plots of FIGS. 8E and 8F indicate the positive torque gradient values outputted at block 366 of FIG. 6B. Similarly, the area "G" of the plot shown in FIG. 8F indicates the negative torque gradient values outputted at block 368 of FIG. 6C. Under coast conditions, the I-Filter can be used but application can be accomplished with or without an I-Filter.

A preferred embodiment has been disclosed to provide those skilled in the art an understanding of the best mode currently contemplated for the operation and construction of the present invention. However, skilled artisans will appreciate that the clutch control system disclosed herein is also applicable to adaptively control torque transfer across a transfer clutch in other power transfer systems. The invention being thus described, it will be obvious that various modifications can be made without departing from the true spirit and scope of the invention, and all such modifications as would be considered by those skilled in the art are intended to be included within the scope of the following claims.

What is claimed is:

1. A method of controlling torque transfer in an all-wheel drive vehicle having a powertrain, first and second drivelines, a clutch for controlling the distribution of torque to the first and second drivelines, sensors for determining the wheel speeds for both drivelines, a control unit for calculating a new command torque value, and a clutch actuator energized by the control unit for engaging the clutch to generate the new command torque, said method comprising the steps of:
    calculating a speed difference value based on the wheel speeds detected by the sensors;
    comparing the speed difference value to a threshold value;
    integrating the deviation between the speed difference value and the threshold value once the speed difference exceeds the threshold value;
    continue integration of the deviation until the integral reaches a limit value which is a function of the last command torque value;
    calculating the new command torque value once the integral reaches or exceeds the limit value as a function of the last command torque and a gradient value of the speed difference; and
    outputting a control signal to the clutch actuator corresponding to the new command clutch for engaging the clutch.

2. The method of claim 1 wherein the threshold value is a function of the vehicle speed.

3. The method of claim 1 further comprising the step of initiating a hold time once the speed difference value is less than the threshold value.

4. A method for controlling transfer of drive torque in an all-wheel drive vehicle having a powertrain, first and second drive axles, a controllable clutch operable to control the distribution of drive torque to the axles, sensors for the wheel speeds of both axles, a control unit for determining a new command torque capacity of the clutch, and an actuator to set the torque capacity with the following, sequentially repeated steps:
    (a) calculate a speed difference value from the sensors based on the wheel speeds of the first and second drive axles;
    (b) if the speed difference value passes a first threshold value, then integrate the deviation between the speed difference value and the threshold value until the integral reaches a limit value, which is a function of the last command torque capacity of the clutch; and
    (c) if the integral reaches or exceeds this limit value, determine a new command torque capacity as a function of the last command torque capacity and a gradient of the speed difference value, which new command torque capacity is set by the actuator engaging the clutch.

5. The control method according to claim 4 wherein the first threshold value is a function of the speed of the vehicle.

6. The control method according to claim 4 wherein:
    (a) a vehicle speed is calculated based on signals of the wheel speed sensors of the first and the second drive axles;
    (b) the speed difference value of the wheels is compared with a second threshold value which is a function of the vehicle speed; and
    (c) if the speed difference value becomes less than the second threshold value, the torque capacity is reduced by a value determined as a function of the difference between the speed difference value and the second threshold value and/or as a function of a kinematic slip because of cornering.

7. The control method according to claim 4 wherein a hold time starts if the first threshold value is passed downwards, and a second threshold value is determined as function of vehicle speed;
    (a) if the second threshold value is passed downwards after the hold time, then the torque capacity is derived as a first function of the deviation between the speed difference value from the second threshold value; or
    (b) if the second threshold is passed within the hold time, starting after expiration of the hold time the torque capacity is derived as a second function of the deviation between the speed difference from the second threshold value; or
    (c) if the second threshold value is not passed, the new command torque capacity is set equal to the last command torque capacity.

8. The control method according to claim 4 or 7 wherein when the first threshold is passed downwards, integration of the deviation between the speed difference value and the first threshold value is started, whereby the speed difference values lower than the first threshold are taken as negative.

9. The control method according to claim 7 wherein if the speed difference value is lower than the second threshold, the new command torque capacity is derived according to a function of the deviation between the speed difference and the second threshold and/or as a function of a kinematic slip because of cornering.

10. The control method according to claim 7 wherein the speed difference of the wheels of the first and second driven axles is derived from the signals of the sensors using a $1^{st}$ order filter with a defined filter-constant.

11. The control method according to claim 7 wherein the first and second threshold values are modified using the speed difference during cornering.

12. The control method according to claim 7 wherein the first and second threshold values are modified using the speed difference resulting from differences in tire diameters.

13. The control method according to claim 7 wherein pursuant to the sign of the speed difference value and the engine torque it is distinguished between a drive-slip condition and a coast-slip condition, and if
   (a) the sign of the speed difference value and the engine torque are positive, then the function of the vehicle speed follows a first curve, and if
   (b) the sign of the speed difference value and the engine torque are negative, then the function of the vehicle speed follows a second curve.

14. The control method according to claim 7 wherein the new command torque capacity is compared with the actual torque capacity set by the actuator of the clutch, and if the deviation therebetween exceeds a defined tolerance value the new command torque capacity is set equal to the sum of the actual torque capacity and the tolerance value.

15. A method for controlling transfer of drive torque in an all-wheel drive vehicle, the all-wheel drive vehicle operating in a coast slip-condition and having a powertrain, first and second drive axles, a controllable clutch operable to control the distribution of drive torque to the axles, sensors for the wheel speeds of both axles, a control unit for determining a new command torque capacity of the clutch, and an actuator to set the torque capacity with the following, sequentially repeated steps:
   (a) calculate a speed difference value from the sensors based on the wheel speeds of the first and second drive axles;
   (b) if the speed difference value reaches or passes a first threshold for coast condition then determine a new command torque capacity as a function of the deviation between the speed difference and first threshold value for coast condition and as a function of the gradient of the speed difference value, which new command torque capacity is set by the actuator engaging the clutch.

16. The method of claim 15 wherein the first threshold value for coast condition is a function of the vehicle speed.

17. The control method according to claim 15 wherein:
   (a) a vehicle speed is calculated based on signals of the wheel speed sensors of the first and the second drive axles;
   (b) the speed difference value of the wheels is compared with a second threshold value for coast condition which is a function of the vehicle speed; and
   (c) if the speed difference value becomes less than the second threshold value for coast condition, the torque capacity is reduced by a value determined as a function of the difference between the speed difference value and the second threshold value for coast condition.

18. The control method according to claim 15 wherein a hold time starts if the first threshold value for coast condition is passed downwards, and a second threshold value for coast condition is determined as function of vehicle speed;
   (a) if the second threshold value for coast condition is passed downwards after the hold time, then the torque capacity is derived as a first function of the deviation between the speed difference value from the second threshold value for coast condition; or
   (b) if the second threshold for coast condition is passed within the hold time, starting after expiration of the hold time the torque capacity is derived as a second function of the deviation between the speed difference from the second threshold value for coast condition; or
   (c) if the second threshold value for coast condition is not passed, the new command torque capacity is set equal to the last command torque capacity.

* * * * *